US012275261B2

(12) United States Patent
Yu et al.

(10) Patent No.: US 12,275,261 B2
(45) Date of Patent: Apr. 15, 2025

(54) THERMAL TRANSFER SHEET AND METHOD FOR PRODUCING PRINTED MATERIAL

(71) Applicant: Dai Nippon Printing Co., Ltd., Tokyo (JP)

(72) Inventors: Yue Yu, Tokyo (JP); Hiroshi Eguchi, Tokyo (JP); Masayuki Tani, Tokyo (JP); Yasushi Yoneyama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/760,191

(22) PCT Filed: Feb. 25, 2021

(86) PCT No.: PCT/JP2021/007072
§ 371 (c)(1),
(2) Date: Aug. 5, 2022

(87) PCT Pub. No.: WO2021/172417
PCT Pub. Date: Sep. 2, 2021

(65) Prior Publication Data
US 2023/0082532 A1 Mar. 16, 2023

(30) Foreign Application Priority Data
Feb. 25, 2020 (JP) ................................. 2020-029659
Jun. 26, 2020 (JP) ................................. 2020-110587

(51) Int. Cl.
*B41M 5/52* (2006.01)
*B41M 5/385* (2006.01)
*B41M 5/42* (2006.01)

(52) U.S. Cl.
CPC ............. *B41M 5/385* (2013.01); *B41M 5/42* (2013.01); *B41M 5/52* (2013.01)

(58) Field of Classification Search
CPC .......... B41M 5/385; B41M 5/42; B41M 5/52
(Continued)

(56) References Cited

U.S. PATENT DOCUMENTS 4,902,669 A * 2/1990 Matsuda ............ B41M 5/38207 503/227
6,989,350 B2 1/2006 Hirota et al.
(Continued)

FOREIGN PATENT DOCUMENTS

CN 104085215 A 10/2014
JP H06-099673 A 4/1994
(Continued)

OTHER PUBLICATIONS

International Search Report and Written Opinion (Application No. PCT/JP2021/007072) dated May 18, 2021 (with English translation).

(Continued)

*Primary Examiner* — Betelhem Shewareged
(74) *Attorney, Agent, or Firm* — BURR PATENT LAW, PLLC

(57) ABSTRACT

A thermal transfer sheet includes a substrate and a transfer layer, in which the transfer layer after transfer has a reduced peak height (Spk) of 0.6 μm or more. A method for producing a printed material using a thermal transfer sheet including a particle layer disposed on a substrate and an image-receiving sheet including a thermal protrusion-and/or-recess forming layer and a receiving layer stacked in that order on a second substrate, the receiving layer including an image that has been formed, includes the steps of heating the image-receiving sheet to form a protrusion and/or a recess at the image-receiving sheet, and heating the thermal transfer sheet to transfer the particle layer to at least part of the protrusion of the image-receiving sheet.

8 Claims, 6 Drawing Sheets

(58) Field of Classification Search
USPC .......................................................... 428/32.6
See application file for complete search history.

(56) References Cited

U.S. PATENT DOCUMENTS

| | | | | |
|---|---|---|---|---|
| 2005/0067090 | A1* | 3/2005 | Nakayama | B41M 5/385 347/213 |
| 2007/0203267 | A1* | 8/2007 | Richard | G02F 1/133606 524/47 |
| 2018/0288884 | A1* | 10/2018 | Ori | H05K 3/4655 |
| 2023/0082532 | A1* | 3/2023 | Yu | B41M 5/52 430/200 |

FOREIGN PATENT DOCUMENTS

| | | | |
|---|---|---|---|
| JP | 2000-326697 | A | 11/2000 |
| JP | 2001-080215 | A | 3/2001 |
| JP | 2003-251909 | A | 9/2003 |
| JP | 2004-122756 | A | 4/2004 |
| JP | 2006-159812 | A | 6/2006 |
| JP | 2007-171843 | A | 7/2007 |
| JP | 2011-000866 | A | 1/2011 |
| JP | 2014-124865 | A | 7/2014 |
| JP | 2015-134429 | A | 7/2015 |
| JP | 2015-174328 | A | 10/2015 |
| JP | 6520364 | B2 | 5/2019 |

OTHER PUBLICATIONS

English translation of International Preliminary Report on Patentability (Chapter I) (Application No. PCT/JP2021/007072) 8 pages dated Sep. 9, 2022.
Chinese Office Action (with English translation) dated May 11, 2024 (Application No. 202180016609.6).
Chinese Office Action (with English translation) dated Jan. 20, 2025 (Application No. 202180016609.6).

* cited by examiner

THERMAL TRANSFER SHEET AND METHOD FOR PRODUCING PRINTED MATERIAL

CROSS REFERENCE TO RELATED APPLICATIONS

This application claims the priority of Japanese Patent Application No. 2020-029659 filed on Feb. 25, 2020 and No. 2020-110587 filed on Jun. 26, 2020, which are hereby incorporated by reference herein in their entirety.

TECHNICAL FIELD

The present disclosure relates to a thermal transfer sheet, a printed material, a method for producing a printed material, and a combination of a thermal transfer sheet and an image-receiving sheet.

BACKGROUND ART

Hitherto, various printing methods have been known (see Patent Literature 1).

For example, a thermofusible transfer method is known in which energy is applied to a thermal transfer sheet including a substrate and a transfer layer with, for example, a thermal head to transfer the transfer layer onto a transfer-receiving article, such as paper or a plastic sheet, thereby forming an image or a protective layer. Images formed by the thermofusible transfer method have high density and excellent sharpness; thus, printed materials having excellent design properties can be produced.

In recent years, there has been a demand for further improvement in the design properties of printed materials, such as the addition of a tactile three-dimensional effect. Specifically, there has been a demand for, for example, a printed material having a protrusion-and/or-recess shape on a surface thereof.

For example, a sublimation type thermal transfer method is known. The sublimation type thermal transfer method enables density gradation to be freely adjusted, has excellent reproducibility of neutral colors and of gradation, and makes it possible to form high-quality images comparable to silver halide photographs.

In the sublimation type thermal transfer method, a thermal transfer sheet including a sublimation transfer-type coloring material layer containing a sublimation dye and a thermal transfer image-receiving sheet including a receiving layer are superposed on each other, and then the thermal transfer sheet is heated by a thermal head of a printer to transfer the sublimation dye in the sublimation transfer-type coloring material layer to the receiving layer to form an image, thereby providing a printed material. In addition, a protective layer is transferred from a thermal transfer sheet onto the receiving layer of the printed material produced in this way to improve the durability and other properties of the printed material.

In recent years, printed materials obtained by the above-described methods have been required to have a wide variety of design properties. For example, printed materials with high three-dimensional effects have been required for the purpose of expressing rarity and so forth of printed materials.

CITATION LIST

Patent Literature

PTL 1: Japanese Patent No. 6520364

SUMMARY OF INVENTION

Technical Problem

A first object of the present disclosure is to provide a thermal transfer sheet capable of producing a printed material having a good protrusion-and/or-recess shape on a surface thereof, and a printed material having a good protrusion-and/or-recess shape on a surface thereof.

A second object of the present disclosure is to provide a method for producing a printed material having a high three-dimensional effect, and a combination of a thermal transfer sheet and an image-receiving sheet.

Solution to Problem

A thermal transfer sheet according to a first aspect of the present disclosure includes a substrate and a transfer layer, in which, after transfer, the transfer layer has a reduced peak height (Spk) of 0.6 μm or more.

In another embodiment of the present disclosure, the thermal transfer sheet according to the first aspect includes the substrate and the transfer layer, in which the transfer layer contains visible light-nonabsorbing glass particles.

A printed material according to the first aspect of the present disclosure includes a transfer-receiving article and a transfer layer, in which a surface of the transfer layer side has a reduced peak height (Spk) of 0.6 μm or more.

A method according to a second aspect of the present disclosure for producing a printed material using a thermal transfer sheet including a particle layer disposed on a first substrate and an image-receiving sheet including a thermal protrusion-and/or-recess forming layer and a receiving layer stacked in that order on a second substrate, the receiving layer including an image that has been formed, includes the steps of heating the image-receiving sheet to form a protrusion and/or a recess at the image-receiving sheet, and heating the thermal transfer sheet to transfer the particle layer to at least part of the protrusion of the image-receiving sheet.

In a combination of a thermal transfer sheet and an image-receiving sheet according to the second aspect of the present disclosure, the thermal transfer sheet includes a first substrate and a particle layer disposed on a surface of the first substrate, the particle layer contains visible light-nonabsorbing particles, the image-receiving sheet includes a second substrate, a thermal recess-forming layer disposed on the second substrate, and a receiving layer disposed on the thermal recess-forming layer, and the thermal recess-forming layer includes at least one of a porous film and a hollow particle-containing layer.

In another embodiment of the present disclosure, in a combination of a thermal transfer sheet and an image-receiving sheet according to the second aspect, the thermal transfer sheet includes a first substrate and a particle layer disposed on a surface of the first substrate, the particle layer contains visible light-nonabsorbing particles, the image-receiving sheet includes a second substrate, a thermal protrusion-forming layer disposed on the second substrate, and a receiving layer disposed on the thermal protrusion-forming layer, and the thermal protrusion-forming layer contains foamable hollow particles.

Advantageous Effects of Invention

According to the present disclosure, it is possible to provide a thermal transfer sheet capable of producing a printed material having a good protrusion-and/or-recess shape on a surface thereof, and a printed material having a good protrusion-and/or-recess shape on a surface thereof.

According to the present disclosure, it is possible to provide a method for producing a printed material having a high three-dimensional effect, and a combination of a thermal transfer sheet and an image-receiving sheet.

DESCRIPTION OF EMBODIMENTS

Figure 1:
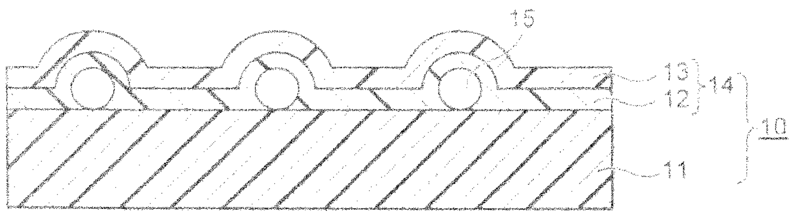
FIG. 1 is a schematic cross-sectional view of a thermal transfer sheet according to an embodiment of the present disclosure.

Embodiments will be described below with reference to the drawings as needed. In the drawings, components may be illustrated schematically regarding the width, thickness, and the like, instead of being illustrated in accordance with the actual forms, for the sake of clearer illustration. The schematic drawings are merely examples and do not limit the interpretations of the present disclosure in any way. In the present specification and the drawings, elements similar to those described above with respect to the drawings already illustrated may be designated using the same reference numerals, and detailed descriptions may be omitted as appropriate.

[First Aspect]

A first aspect of the present disclosure will be described below.

The first aspect relates to a thermal transfer sheet and a printed material.

<Thermal Transfer Sheet>

The thermal transfer sheet of the present disclosure includes a substrate and a transfer layer. For the thermal transfer sheet, peeling can be performed during thermal transfer at the interface between the substrate and the transfer layer to transfer the transfer layer to a transfer-receiving article.

Thermal transfer using the thermal transfer sheet of the present disclosure can be performed on a transfer-receiving article by appropriately adjusting energy applied from a heating means with a conventionally known thermal transfer printer. Examples of the heating means that can be used include thermal heads, heat plates, hot stampers, heat rolls, line heaters, and irons.

The transfer-receiving article may have, for example, high smoothness or may have a protrusion-and/or-recess structure. Examples of the transfer-receiving article that can be used include paper substrates, such as wood-free paper, art paper, coated paper, resin-coated paper, cast coated paper, paper board, synthetic paper, and impregnated paper; and resin films described below.

In the thermal transfer sheet of the present disclosure, the transfer layer after transfer has a reduced peak height (Spk) of 0.6 μm or more. The present disclosers have found that the protrusion-and/or-recess shape of a printed material is affected by the size of the protrusion from a surface of the transfer layer. The size of the protrusion depends on, for example, the protrusion state of the particles on the surface of the transfer layer. Spk is a numerical value representing the average height of protruding peak portions on a core portion in the measured surface roughness curve, and is specifically an index indicating the state of local rise of the protruding portions. Thus, it can be said that Spk is an index that satisfactorily indicates the protrusion-and/or-recess shape of the printed material. It is thus possible to produce a printed material having a good protrusion-and/or-recess shape. Spk is preferably 0.6 μm or more and 2.0 μm or less, more preferably 0.7 μm or more and 1.2 μm or less.

Spk is measured on a surface of the transfer layer side after the transfer layer is transferred from the thermal transfer sheet to the transfer-receiving article. Specifically, the transfer conditions for measuring Spk are as described in the Examples section. The same applies to the following parameters other than Spk.

In the thermal transfer sheet of the present disclosure, it is possible to produce a printed material having a better protrusion-and/or-recess shape by adjusting parameters (such as Vmp) representing the state of the transfer layer after transfer in addition to Spk.

In the present disclosure, a parameter, such as Spk, representing a surface state is a parameter defined in ISO 25178-2:2012. Spk can be adjusted to the above range by appropriately selecting, for example, the type, content, density, and average particle size of the visible light-nonabsorbing particles in the transfer layer, the thickness of the layer containing the visible light-nonabsorbing particles, and the formation temperature and time at the time of layer formation of each layer.

In the thermal transfer sheet of the present disclosure, at least one of the developed interfacial area ratio (Sdr), the root mean square gradient (Sdq), the density of peaks (Spd), the peak extreme height (Sxp), the arithmetic mean peak curvature (Spc), and the peak material volume (Vmp) of the transfer layer after transfer, is preferably in the following range.

Sdr is preferably 0.01 or more and 0.045 or less, more preferably 0.02 or more and 0.035 or less. Sdq is preferably 0.1 or more and 0.3 or less, more preferably 0.2 or more and 0.27 or less. Spd is preferably 105,000 $\mu m^{-2}$ or more and 150,000 $\mu m^{-2}$ or less, more preferably 120,000 $\mu m^{-2}$ or more and 135,000 $\mu m^{-2}$ or less. Sxp is preferably 1.1 μm or more and 2 μm or less, more preferably 1.3 μm or more and 1.8 μm or less. Spc is preferably 350 or more and 510 or less, more preferably 400 or more and 480 or less. Vmp is preferably 0.03 $mL/m^2$ or more and 0.053 $mL/m^2$ or less, more preferably 0.035 $mL/m^2$ or more and 0.048 $mL/m^2$ or less.

Embodiments of the thermal transfer sheet of the present disclosure will be described below with reference to the drawings.

In one embodiment, as illustrated in FIG. 1, a thermal transfer sheet 10 includes a substrate 11 and a transfer layer 14 including a peeling layer 12 and an adhesive layer 13, in which the peeling layer 12 contains visible light-nonabsorbing particles 15.

Figure 2:
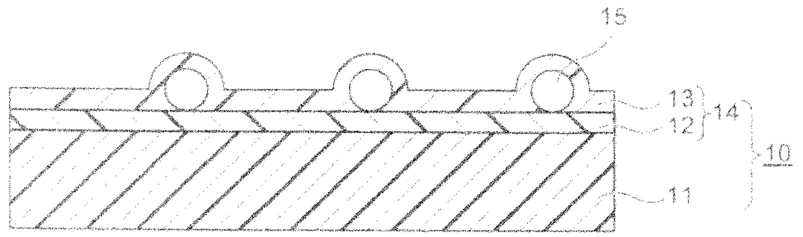
FIG. 2 is a schematic cross-sectional view of a thermal transfer sheet according to an embodiment of the present disclosure.

In one embodiment, as illustrated in FIG. 2, the thermal transfer sheet 10 includes the substrate 11 and the transfer layer 14 including the peeling layer 12 and the adhesive layer 13, in which the adhesive layer 13 contains the visible light-nonabsorbing particles 15.

Figure 3:
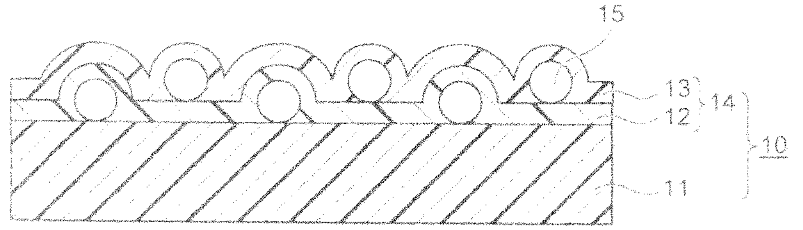
FIG. 3 is a schematic cross-sectional view of a thermal transfer sheet according to an embodiment of the present disclosure.

In one embodiment, as illustrated in FIG. 3, the thermal transfer sheet 10 includes the substrate 11 and the transfer layer 14 including the peeling layer 12 and the adhesive layer 13, in which the peeling layer 12 and the adhesive layer 13 contain the visible light-nonabsorbing particles 15.

Figure 4:
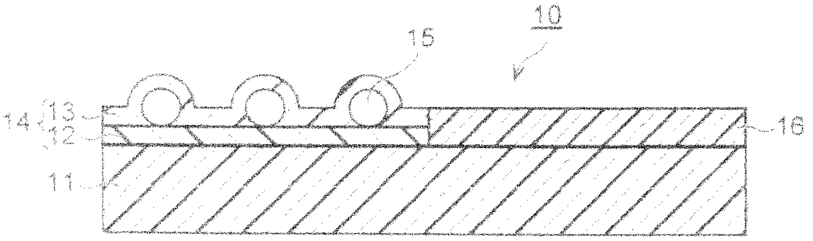
FIG. 4 is a schematic cross-sectional view of a thermal transfer sheet according to an embodiment of the present disclosure.

In one embodiment, as illustrated in FIG. 4, the thermal transfer sheet 10 includes the transfer layer 14 including the peeling layer 12 and the adhesive layer 13 and a protective layer 16, which are disposed as being frame sequentially on the same surface of the substrate 11, in which the adhesive layer 13 contains the visible light-nonabsorbing particles 15.

Figure 5:
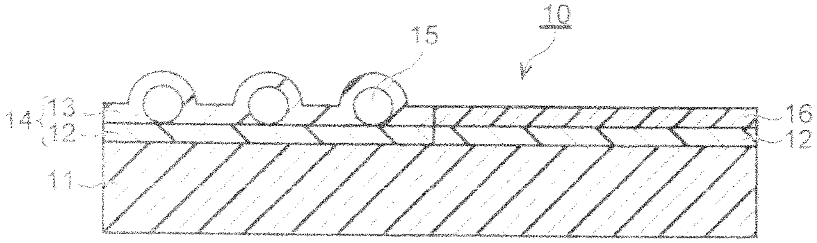
FIG. 5 is a schematic cross-sectional view of a thermal transfer sheet according to an embodiment of the present disclosure.

In one embodiment, as illustrated in FIG. 5, the thermal transfer sheet 10 includes the transfer layer 14 including the peeling layer 12 and the adhesive layer 13 and a layer including the peeling layer 12 and the protective layer 16, which are disposed as being frame sequentially on the same surface of the substrate 11, in which the adhesive layer 13 contains the visible light-nonabsorbing particles 15.

In one embodiment, a thermal transfer sheet includes a coloring material layer and a transfer layer, which are disposed as being frame sequentially on the same surface of a substrate (not illustrated in the drawings). In one embodiment, a thermal transfer sheet includes a coloring material layer, a transfer layer, and a protective layer, which are disposed as being frame sequentially on the same surface of a substrate (not illustrated in the drawings). In one embodiment, a thermal transfer sheet includes a coloring material layer, a transfer layer including a peeling layer and an adhesive layer, and a layer including a peeling layer and a protective layer, which are disposed as being frame sequentially on the same surface of a substrate (not illustrated in the drawings). In one embodiment, a thermal transfer sheet includes a back layer on a surface of a substrate opposite that on which a transfer layer is provided (not illustrated in the drawings).

In one embodiment, a thermal transfer sheet includes a substrate and a transfer layer including a peeling layer and a receiving layer, in which the peeling layer and/or the receiving layer contains visible light-nonabsorbing particles (not illustrated in the drawings).

Each of the layers included in the thermal transfer sheet of the present disclosure will be described below.

(Substrate)

The substrate is not particularly limited as long as it has heat resistance to thermal energy applied during thermal transfer, mechanical strength capable of supporting, for example, the peeling layer and the adhesive layer provided on the substrate, and solvent resistance.

As the substrate, for example, a film composed of a resin material (hereinafter, referred to simply as a "resin film") can be used. Examples of the resin material include polyesters, such as poly(ethylene terephthalate) (PET), poly(butylene terephthalate) (PBT), poly(ethylene naphthalate) (PEN), 1,4-poly(cyclohexylenedimethylene terephthalate), and terephthalic acid-cyclohexanedimethanol-ethylene glycol copolymers; polyamides, such as nylon 6 and nylon 6,6; polyolefins, such as polyethylene (PE), polypropylene (PP), and polymethylpentene; vinyl resins, such as poly(vinyl chloride), poly(vinyl alcohol) (PVA), poly(vinyl acetate), vinyl chloride-vinyl acetate copolymers, poly(vinyl butyral), and poly(vinyl pyrrolidone) (PVP); (meth)acrylic resins, such as polyacrylate and polymethacrylate; imide resins, such as polyimide and poly(ether imide); cellulose resins, such as cellophane, cellulose acetate, nitrocellulose, cellulose acetate propionate (CAP), and cellulose acetate butylate (CAB); styrene resins, such as polystyrene (PS); polycarbonate; and ionomer resins.

Among the above resins, polyesters, such as PET and PEN, are preferable, and PET is particularly preferable, from the viewpoint of heat resistance and mechanical strength.

In the present disclosure, the term "(meth)acrylic" encompasses both "acrylic" and "methacrylic". The term "(meth)acrylate" encompasses both "acrylate" and "methacrylate".

A laminate including the resin film may be used as a substrate. The laminate of the resin film can be produced by, for example, a dry lamination method, a wet lamination method, and an extrusion method.

When the substrate is a resin film, the resin film may be a stretched film or an unstretched film. The resin film is preferably uniaxially or biaxially stretched film from the viewpoint of mechanical strength.

The substrate preferably has a thickness of 2 μm or more and 25 μm or less, more preferably 3 μm or more and 10 μm or less. This results in good mechanical strength of the substrate and good thermal energy transfer during the thermal transfer.

(Transfer Layer)

The transfer layer included in the thermal transfer sheet of the present disclosure is a layer to be transferred to a transfer-receiving article during thermal transfer. In one embodiment, the transfer layer includes at least a peeling layer and an adhesive layer. In one embodiment, the transfer layer includes at least a peeling layer and a receiving layer.

In one embodiment, the transfer layer contains one or two or more types of visible light-nonabsorbing particles. This can result in the production of a printed material having a better protrusion-and/or-recess shape.

The visible light-nonabsorbing particles are particles with no or little absorption in the visible light region (absorption in the visible light range is typically 30% or less). Examples thereof include particles composed of, for example, glass, zeolite, and zirconium phosphate. The glass particles are particles of, for example, silicate glass, phosphate glass, or borate glass. In particular, silicate glass is preferred. In this specification, the term "visible light region" indicates a wavelength region of 400 nm or more and 750 nm or less.

The above-described Spk of the transfer layer can also be adjusted by the degree of affinity (wettability) of the particles for the resin material in the layer containing the particles. The use of the particles having low wettability results in easy separation of the particles from the resin material in a state where the transfer layer is softened during transfer, so that the particles protrude easily from the surface of the transfer layer after the transfer, and Spk tends to increase.

The shape of the visible light-nonabsorbing particles is not limited to a particular shape. The visible light-nonabsorbing particles may be, for example, particles having a definite shape, such as a spherical shape, a distorted spherical shape, a circular stone shape, or a rugby ball shape, or particles having an indefinite shape obtained by pulverizing a large lump. Among these, a spherical shape is preferred because a printed material having a better protrusion-and/or-recess shape can be produced.

The visible light-nonabsorbing particles may be hollow particles with shells of glass, or may be solid particles of glass. Among these, the hollow particles are preferred because a peeling layer and/or an adhesive layer in which visible light-nonabsorbing particles are satisfactorily dispersed can be formed when producing a thermal transfer sheet.

The visible light-nonabsorbing particles preferably have a density of 0.20 g/cm$^3$ or more and 3.00 g/cm$^3$ or less, more preferably 0.50 g/cm$^3$ or more and 2.00 g/cm$^3$ or less, even more preferably 0.80 g/cm$^3$ or more and 1.50 g/cm$^3$ or less. The density is true density and measured with a pycnometer (gas-phase displacement type true density meter). For example, the use of low-density particles inhibits particle sedimentation during layer formation, thereby resulting in good particle dispersion in the layer.

The visible light-nonabsorbing particles preferably have an average particle size of 2 μm or more and 20 μm or less, more preferably 5 μm or more and 15 μm or less, even more preferably 8 μm or more and 15 μm or less. This makes it possible to produce a printed material having a better protrusion-and/or-recess shape and to improve the fingerprint resistance of the transfer layer after transfer. The average particle size of visible light-nonabsorbing particles is measured by a laser diffraction method according to JIS Z8825-1:2013. For example, when a particle size having a large average particle size is used, Spk tends to be large.

The transfer layer preferably has a visible light-nonabsorbing particle content of 5% by mass or more and 60% by mass or less, more preferably 10% by mass or more and 50% by mass or less, even more preferably 15% by mass or more and 40% by mass or less. This makes it possible to produce a printed material having a better protrusion-and/or-recess shape and to improve the durability and the fingerprint resistance of the transfer layer after transfer.

(Peeling Layer)

The peeling layer is a layer provided in order to easily peel the transfer layer from the substrate at the time of thermal transfer. Providing the peeling layer makes it possible to peel off the transfer layer from the substrate and reliably and easily transfer the transfer layer to the transfer-receiving article. The peeling layer is a layer that is to be peeled off from the substrate at the time of thermal transfer and then to be transferred onto the transfer-receiving article.

In an embodiment in which the thermal transfer sheet of the present disclosure includes a protective layer described below, a peeling layer may be disposed between the substrate and the protective layer. The peeling layer between the substrate and the adhesive layer and the peeling layer between the substrate and the protective layer may be independent layers or may be an integrated layer.

In one embodiment, the peeling layer contains one or two or more resin materials. Examples of the resin materials include vinyl resins, such as ethylene-vinyl acetate copolymers and vinyl chloride-vinyl acetate copolymers, (meth) acrylic resins, cellulosic resins, and polyesters.

The peeling layer preferably has a resin material content of 10% by mass or more and 80% by mass or less, more preferably 15% by mass or more and 70% by mass or less, even more preferably 20% by mass or more and 60% by mass or less. Thereby, when the peeling layer contains the visible light-nonabsorbing particles, the dispersibility and retainability thereof can be improved. When the peeling layer does not contain the visible light-nonabsorbing particles, the upper limit of the resin material content may be 100% by mass.

In one embodiment, the peeling layer contains one or two or more types of visible light-nonabsorbing particles. This can result in the production of a printed material having a good protrusion-and/or-recess shape. Since the types and preferred embodiments of the visible light-nonabsorbing particles have been described above, the description thereof will be omitted here.

The peeling layer preferably has a visible light-nonabsorbing particle content of 20% by mass or more and 90% by mass or less, more preferably 30% by mass or more and 80% by mass or less. This makes it possible to produce a printed material having a better protrusion-and/or-recess shape and to improve the durability and the fingerprint resistance of the transfer layer after transfer.

The peeling layer may contain one or two or more waxes. Examples of the waxes include microcrystalline wax, carnauba wax, paraffin wax, Fischer-Tropsch wax, Japan wax, beeswax, spermaceti, Chinese wax, lanoline, shellac wax, candelilla wax, petrolactum, partially modified wax, fatty acid esters, and fatty acid amides.

The peeling layer may contain one or two or more additives. Examples of the additives include fillers, plasticizers, antistatic materials, ultraviolet absorbers, fine inorganic particles, fine organic particles, release materials, and dispersants.

The peeling layer preferably has a thickness of 0.1 μm or more and 3 μm or less, more preferably 0.5 μm or more and 2.5 μm or less. This makes it possible to produce a printed material having a better protrusion-and/or-recess shape and to improve the durability and the fingerprint resistance of the transfer layer after transfer.

The peeling layer can be formed by dispersing the above material in water or an appropriate solvent, or dissolving the above material in water or an appropriate solvent, to prepare a coating liquid, applying the coating liquid onto, for example, a substrate to form a coating film, and drying the coating film. As an application means, for example, a known means, such as a roll coating method, a reverse roll coating method, a gravure coating method, a reverse gravure coating method, a bar coating method, or a rod coating method, can be used.

(Adhesive Layer)

In one embodiment, the adhesive layer is a layer constituting the outermost surface of the transfer layer. This makes it possible to improve the adhesion of the transfer layer to the transfer-receiving article.

In one embodiment, the adhesive layer contains one or two or more thermoplastic resins that are softened by heating and that exhibit adhesion. Examples of the thermoplastic resins include vinyl resins, such as poly(vinyl chloride), poly(vinyl acetate), and vinyl chloride-vinyl acetate copolymers, polyesters, (meth)acrylic resins, polyurethanes, cellulosic resins, melamine resins, polyamides, polyolefins, and styrene resins.

The adhesive layer preferably has a thermoplastic resin content of 5% by mass or more and 70% by mass or less, more preferably 10% by mass or more and 60% by mass or less, even more preferably 15% by mass or more and 40% by mass or less. This makes it possible to further improve the adhesion between the transfer layer and the transfer-receiving article. In addition, when the adhesive layer contains the visible light-nonabsorbing particles, the dispersibility and retainability thereof can be improved.

In one embodiment, the adhesive layer contains one or two or more types of visible light-nonabsorbing particles. This can result in the production of a printed material having a good protrusion-and/or-recess shape. Since the types and preferred embodiments of the visible light-nonabsorbing particles have been described above, the description thereof will be omitted here.

The adhesive layer preferably has a visible light-nonabsorbing particle content of 5% by mass or more and 60% by mass or less, more preferably 10% by mass or more and 50% by mass or less, even more preferably 15% by mass or more and 40% by mass or less. This can result in the production of a printed material having a better protrusion-and/or-recess shape.

In one embodiment, the adhesive layer contains one or two or more lubricants. This can reduce the occurrence of wrinkles (hereinafter, referred to as "printing wrinkles") in the printed material. Examples of the lubricant include silicones, such as modified silicone oils and silicone-modified resins; metal soaps, such as zinc stearate, zinc phosphate stearate, calcium stearate, and magnesium stearate; fatty acid amides; polyethylene wax; carnauba wax; and paraffin wax.

The adhesive layer preferably has a lubricant content of 25% by mass or more and 80% by mass or less, more preferably 30% by mass or more and 70% by mass or less, even more preferably 40% by mass or more and 60% by mass or less. This can further reduce the occurrence of printing wrinkles.

The adhesive layer can contain one or two or more additives described above.

The adhesive layer preferably has a thickness of 0.1 μm or more and 3 μm or less, more preferably 0.5 μm or more and 2 μm or less.

The adhesive layer can be formed by dispersing the above material in water or an appropriate solvent, or dissolving the above material in water or an appropriate solvent, to prepare a coating liquid, applying the coating liquid onto, for example, the peeling layer by the application means to form a coating film, and drying the coating film.

(Receiving Layer)

In one embodiment, the receiving layer contains one or two or more resin materials. Examples of the resin materials include polyolefins, vinyl resins, such as poly(vinyl chloride) and vinyl chloride-vinyl acetate copolymers, (meth) acrylic resins, cellulosic resins, polyesters, polyamides, polycarbonates, styrene resins, epoxy resins, polyurethanes, epoxy resins, and ionomer resins.

The receiving layer has a resin material content of, for example, 40% by mass or more and 100% by mass or less.

In one embodiment, the receiving layer contains one or two or more types of visible light-nonabsorbing particles. This can result in the production of a printed material having a good protrusion-and/or-recess shape. Since the types and preferred embodiments of the visible light-nonabsorbing particles have been described above, the description thereof will be omitted here.

The receiving layer preferably has a visible light-nonabsorbing particle content of 5% by mass or more and 60% by mass or less, more preferably 10% by mass or more and 50% by mass or less, even more preferably 15% by mass or more and 40% by mass or less. This can result in the production of a printed material having a better protrusion-and/or-recess shape.

In one embodiment, the receiving layer contains one or two or more release materials. Examples of the release materials include solid waxes, such as polyethylene wax, polyamide wax, and Teflon (registered trademark) powders, fluorine- and phosphate-based surfactants, silicone oils, various modified silicone oils, such as reactive silicone oils and curable silicone oils, and silicone resins.

The receiving layer has a release material content of, for example, 0.5% by mass or more and 10% by mass or less.

The receiving layer can contain one or two or more additives described above.

The receiving layer has a thickness of, for example, 0.5 μm or more and 20 μm or less.

The receiving layer can be formed by dispersing the above material in water or an appropriate solvent, or dissolving the above material in water or an appropriate solvent, to prepare a coating liquid, applying the coating liquid onto, for example, the peeling layer by the application means to form a coating film, and drying the coating film.

(Coloring Material Layer)

In one embodiment, the thermal transfer sheet of the present disclosure includes one or two or more coloring material layers in such a manner that the transfer layer and the coloring material layers are disposed as being frame sequentially on the same surface. Thus, an image can be formed on a printed material.

In one embodiment, the coloring material layer contains one or two or more resin materials. Examples of the resin materials include vinyl resins, such as ethylene-vinyl acetate copolymers and vinyl chloride-vinyl acetate copolymers, polyesters, polyamides, polyolefins, (meth)acrylic resins, cellulosic resins, styrene resins, and ionomer resins.

Each coloring material layer has a resin material content of, for example, 50% by mass or more and 70% by mass or less.

Each coloring material layer contains one or two or more coloring materials. Each of the coloring materials may be a pigment or dye. The dye may be a sublimation dye.

Examples of the coloring materials include carbon black, acetylene black, lamp black, black smoke, iron black, aniline black, silica, calcium carbonate, titanium oxide, cadmium red, cadmopone red, chromium red, vermilion, colcothar, azo-based pigments, alizarin lake, quinacridone, cochineal lake perylene, yellow ocher, aureolin, cadmium yellow, cadmium orange, chromium yellow, zinc yellow, naples yellow, nickel yellow, azo-based pigments, greenish yellow, ultramarine, blue verditer, cobalt, phthalocyanine, anthraquinone, indigoid, cinnabar green, cadmium green, chromium green, phthalocyanine, azomethine, perylene, and aluminum pigments; and sublimation dyes, such as diarylmethane dyes, triarylmethane dyes, thiazole dyes, merocyanine dyes, pyrazolone dyes, methine dyes, indoaniline dyes, acetophenone azomethine dyes, pyrazolo azomethine dyes, xanthene dyes, oxazine dyes, thiazine dyes, azine dyes, acridine dyes, azo dyes, spiropyran dyes, indolinospiropyran dyes, fluoran dyes, naphthoquinone dyes, anthraquinone dyes, and quinophthalone dyes.

The coloring material layer has a coloring material content of, for example, 25% by mass or more and 45% by mass or less. This can result in good density of an image to be formed.

The coloring material layer may contain one or two or more additives described above.

The coloring material layer has a thickness of, for example, 0.3 or more and 1.2 μm or less.

The coloring material layer can be formed by dispersing the above material in water or an appropriate solvent, or dissolving the above material in water or an appropriate solvent, to prepare a coating liquid, applying the coating liquid onto, for example, the substrate by the application means to form a coating film, and drying the coating film.

(Protective Layer)

In one embodiment, the thermal transfer sheet of the present disclosure includes a protective layer in such a manner that the transfer layer and the protective layer are disposed as being frame sequentially on the same surface.

In one embodiment, the protective layer contains one or two or more resin materials. Examples of the resin materials include (meth)acrylic resins, styrene resins, vinyl resins, polyolefins, polyesters, polyamides, imide resins, cellulosic resins, thermosetting resins, and actinic radiation-curable resins.

In the present disclosure, the term "actinic radiation-cured resin" refers to a resin that has been cured by irradiating the actinic radiation-curable resin with actinic radiation.

In the present disclosure, the term "actinic radiation" refers to radiations that chemically act on actinic radiation-curable resins to promote polymerization, and specifically, refers to, for example, visible light, ultraviolet rays, X-rays, electron beams, α-rays, β-rays, and γ-rays.

The resin material content of the protective layer is preferably, but not necessarily, 50% by mass or more and 100% by mass or less, in light of durability.

The protective layer can contain one or two or more additives described above.

The protective layer preferably has a thickness of 0.5 μm or more and 5 μm or less, more preferably 1 μm or more and 3 μm or less. This makes it possible to further improve the durability.

The protective layer can be formed by dispersing the above material in water or an appropriate solvent, or dissolving the above material in water or an appropriate solvent, to prepare a coating liquid, applying the coating liquid onto, for example, the substrate by the application means to form a coating film, and drying the coating film.

(Back Layer)

In one embodiment, the thermal transfer sheet of the present disclosure includes a back layer on a surface of the substrate opposite that on which the transfer layer is provided. This can suppress, for example, the occurrence of sticking and wrinkling caused by heating during thermal transfer.

In one embodiment, the back layer contains one or two or more resin materials. Examples of the resin materials include polyolefins, polystyrenes, vinyl resins, (meth)acrylic resins, poly(vinyl acetal), such as poly(vinyl butyral) and poly(vinyl acetoacetal), polyesters, polyamides, polyimides, polyurethanes, and cellulosic resins.

The back layer may be a layer formed by cross-linking a resin material having a reactive group, such as a hydroxy group, with a cross-linking material, such as polyisocyanate. Examples of the polyisocyanate include xylene diisocyanate, toluene diisocyanate, isophorone diisocyanate, and hexamethylene diisocyanate.

The back layer can contain one or two or more release materials. Examples of the release materials include fluorine compounds, phosphate compounds, higher fatty acid amide compounds, metal soaps, silicone oils, silicone resins, and waxes, such as polyethylene wax and paraffin wax. This can improve the slip characteristics, for example. The back layer preferably has a release material content of 0.5% by mass or more and 20% by mass or less, more preferably 0.5% by mass or more and 12% by mass or less.

The back layer can contain one or two or more additives described above.

The back layer preferably has a thickness of 0.1 μm or more and 5 μm or less, more preferably 0.3 μm or more and 3 μm or less. This can improve the heat resistance of the thermal transfer sheet.

The back layer can be formed by dispersing the above material in water or an appropriate solvent, or dissolving the above material in water or an appropriate solvent, to prepare a coating liquid, applying, by the application means, the coating liquid onto, for example, a surface of the substrate opposite that on which the transfer layer is provided, to form a coating film, and drying the coating film.

Another Embodiment

In another embodiment of the present disclosure, the thermal transfer sheet includes a substrate and a transfer layer, in which the transfer layer contains glass particles that do not absorb visible light. Since the substrate, the transfer layer, the glass particles, and other configurations have been described above, the description thereof is omitted here.

<Printed Material>

A printed material according to the present disclosure includes a transfer-receiving article and a transfer layer. The transfer layer can be formed using the thermal transfer sheet of the present disclosure.

The printed material is characterized in that the Spk of a surface of the transfer layer side is 0.6 μm or more. Spk is preferably 0.6 μm or more and 2.0 μm or less, more preferably 0.7 μm or more and 1.2 μm or less.

In the present disclosure, the "surface of the transfer layer side" refers to, in the printed material obtained by thermally transferring the transfer layer of the thermal transfer sheet, a surface of the printed material opposite to the transfer-receiving article.

In the printed material of the present disclosure, at least one of Sdr, Sdq, Spd, Sxp, Spc, and Vmp of the surface of the transfer layer side is preferably in the following range.

Sdr is preferably 0.01 or more and 0.045 or less, more preferably 0.02 or more and 0.035 or less. Sdq is preferably 0.1 or more and 0.3 or less, more preferably 0.2 or more and 0.27 or less. Spd is preferably 105,000 $\mu m^{-2}$ or more and 150,000 $\mu m^{-2}$ or less, more preferably 120,000 $\mu m^{-2}$ or more and 135,000 $\mu m^{-2}$ or less. Sxp is preferably 1.1 μm or more and 2 μm or less, more preferably 1.3 μm or more and 1.8 μm or less. Spc is preferably 350 or more and 510 or less, more preferably 400 or more and 480 or less. Vmp is preferably 0.03 mL/m$^2$ or more and 0.053 mL/m$^2$ or less, more preferably 0.035 mL/m$^2$ or more and 0.048 mL/m$^2$ or less.

Embodiments of the printed material according to the present disclosure will be described below with reference to the drawings.

Figure 6:
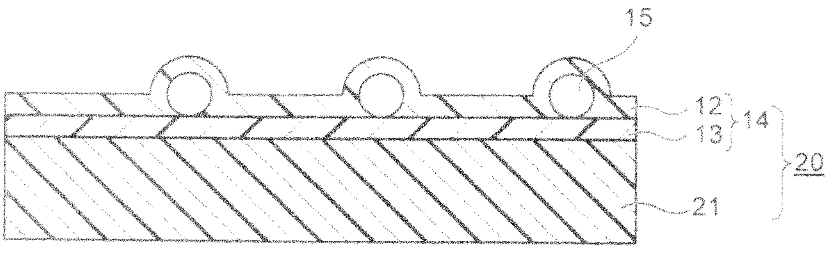
FIG. 6 is a schematic cross-sectional view of a printed material according to an embodiment of the present disclosure.

In one embodiment, as illustrated in FIG. 6, the printed material 20 includes the transfer-receiving article 21 and the transfer layer 14 including the adhesive layer 13 and the peeling layer 12, in which the peeling layer 12 contains the visible light-nonabsorbing particles 15.

Figure 7:
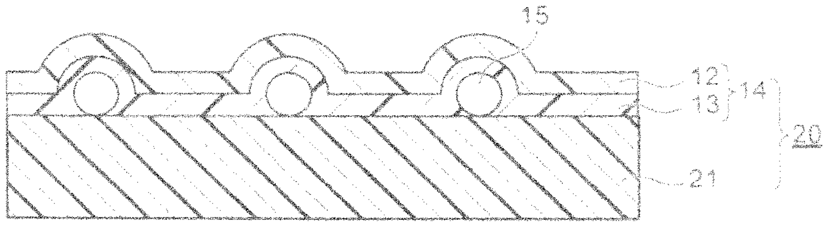
FIG. 7 is a schematic cross-sectional view of a printed material according to an embodiment of the present disclosure.

In one embodiment, as illustrated in FIG. 7, the printed material 20 includes the transfer-receiving article 21 and the transfer layer 14 including the adhesive layer 13 and the peeling layer 12, in which the adhesive layer 13 contains the visible light-nonabsorbing particles 15.

Figure 8:
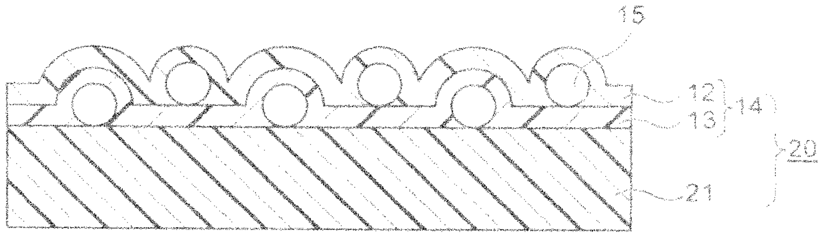
FIG. 8 is a schematic cross-sectional view of a printed material according to an embodiment of the present disclosure.

In one embodiment, as illustrated in FIG. 8, the printed material 20 includes the transfer-receiving article 21 and the transfer layer 14 including the adhesive layer 13 and the peeling layer 12, in which the peeling layer 12 and the adhesive layer 13 contain visible light-nonabsorbing particles 15.

Figure 9:
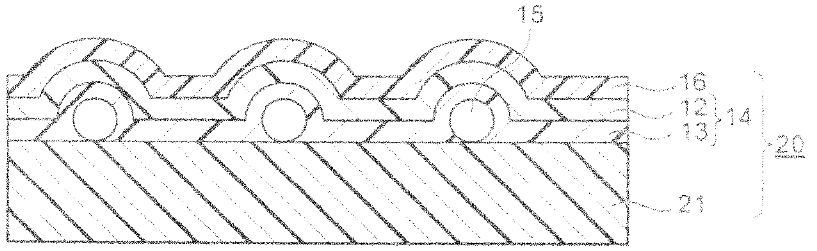
FIG. 9 is a schematic cross-sectional view of a printed material according to an embodiment of the present disclosure.

In one embodiment, as illustrated in FIG. 9, the printed material 20 includes the transfer-receiving article 21, the transfer layer 14 including the adhesive layer 13 and the peeling layer 12, and the protective layer 16, in which the adhesive layer 13 contains visible light-nonabsorbing particles 15.

Figure 10:
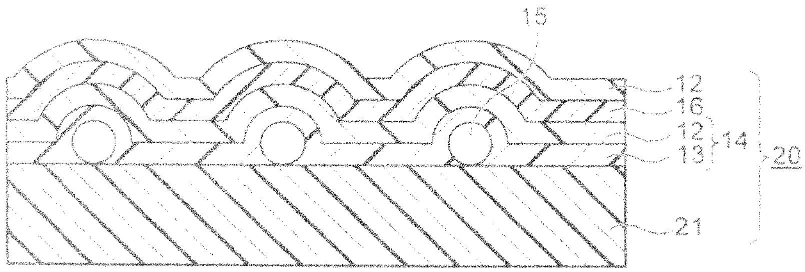
FIG. 10 is a schematic cross-sectional view of a printed material according to an embodiment of the present disclosure.

In one embodiment, as illustrated in FIG. 10, the printed material 20 includes the transfer-receiving article 21, the transfer layer 14 including the adhesive layer 13 and the peeling layer 12, the protective layer 16, and the peeling layer 12, in which the adhesive layer 13 contains visible light-nonabsorbing particles 15.

In one embodiment, the printed material includes an image between the transfer-receiving article and the transfer layer (not illustrated in the drawings).

In one embodiment, the printed material includes a transfer-receiving article and a transfer layer including a receiving layer and a peeling layer, in which the receiving layer and/or the peeling layer contains visible light-nonabsorbing particles (not illustrated in the drawings).

A transfer-receiving article and an image included in the printed material according to the present disclosure will be described below in detail. Since the other configurations have been described above, the description thereof is omitted here.

(Transfer-Receiving Article)

The transfer-receiving article included in the printed material is not particularly limited. For example, a paper substrate, such as wood-free paper, art paper, coated paper, resin-coated paper, cast coated paper, paper board, synthetic paper, or impregnated paper, or a resin film similar to the substrate of the thermal transfer sheet of the present disclosure can be appropriately used in accordance with the intended use.

The thickness of the transfer-receiving article is preferably changed as appropriate in accordance with the intended use. The transfer-receiving article has a thickness of, for example, 0.1 mm or more and 2 mm or less.

(Image)

In one embodiment, the printed material includes an image formed on a transfer-receiving article. The image may be, but not particularly limited to, a character, a pattern, a symbol, or a combination thereof.

[Second Aspect]

A second aspect of the present disclosure will be described below.

The second aspect relates to a method for producing a printed material and a combination of a thermal transfer sheet and an image-receiving sheet. First, the thermal transfer sheet and the image-receiving sheet used in the second aspect will be described, and then a method for producing a printed material will be described.

<Thermal Transfer Sheet>

Figure 11:
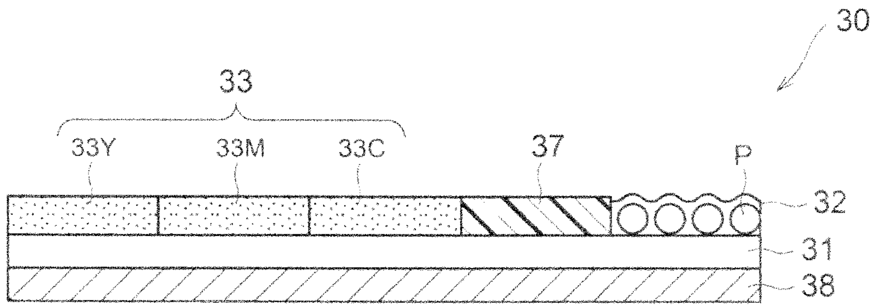
FIG. 11 is a cross-sectional view of a thermal transfer sheet according to an embodiment of the present disclosure.

The thermal transfer sheet includes a first substrate and a particle layer disposed on a surface of the first substrate. FIG. 11 is a cross-sectional view of a thermal transfer sheet according to an embodiment. As illustrated in FIG. 11, a thermal transfer sheet 30 includes a coloring material layer 33, a protective layer 37, a particle layer 32, which are disposed as being frame sequentially on one surface of the first substrate 31, and a back layer 38 on the other surface of the first substrate 31.

The coloring material layer 33 includes a yellow coloring material layer 33Y containing a yellow coloring material, a magenta coloring material layer 33M containing a magenta coloring material, and a cyan coloring material layer 33C containing a cyan coloring material, which are disposed as being frame sequentially on the same surface. The coloring materials contained in the yellow coloring material layer 33Y, the magenta coloring material layer 33M, and the cyan coloring material layer 33Y are, for example, a sublimation dye. The coloring material layer 33 may further include a thermofusible ink layer (not illustrated in the drawings) disposed as being frame sequentially on the same surface.

A peeling layer may be disposed between the protective layer 37 and the first substrate 31.

An adhesive layer may be disposed on the protective layer 37.

The particle layer 32 includes the peeling layer disposed on the first substrate 31 and the adhesive layer disposed on the peeling layer. At least one of the peeling layer and the adhesive layer contains particles P. The particles P are visible light-nonabsorbing particles.

When a group including "five panels" of the yellow coloring material layer 33Y, the magenta coloring material layer 33M, the cyan coloring material layer 33C, the protective layer 37, and the particle layer 32 is defined as "one unit", this "one unit" is repeatedly disposed on one surface of the first substrate 31 of the thermal transfer sheet 30. Using the panels of the "one unit", an image for one image area is formed on the transfer-receiving article.

Each component of the thermal transfer sheet 30 will be described below.

(First Substrate)

As the first substrate 31, a substrate conventionally known in the field of thermal transfer sheets can be appropriately selected and used. An example thereof is a stretched or unstretched film composed of a plastic material. Examples of the plastic material include highly heat-resistant polyesters, such as poly(ethylene terephthalate), poly(ethylene naphthalate), and poly(butylene terephthalate); polyolefins, such as polypropylene and polymethylpentene; poly(phenylene sulfide); poly(ether ketone); poly(ether sulfone); polycarbonates; cellulose acetate; polyethylene derivatives; poly(vinyl chloride); poly(vinylidene chloride); polystyrenes; polyamides; polyimides; and ionomer resins. A composite film including two or more of these materials stacked can also be used.

The first substrate 31 may be subjected to easy-adhesion treatment, such as corona discharge treatment, plasma treatment, ozone treatment, flame treatment, primer (also referred to as an anchor coat, an adhesion promoter, or an easy-adhesive) coating treatment, preheating treatment, dust removal treatment, vapor deposition treatment, alkali treatment, or the formation of an antistatic layer.

The first substrate 31 may contain one or two or more additives, as needed. Examples of the additives include fillers, plasticizers, coloring materials, and antistatic materials.

The first substrate 31 preferably has a thickness of 2 μm or more and 10 μm or less.

(Particle Layer)

The particle layer 32 is disposed on one surface of the first substrate 31 (upper surface of the first substrate 31 in the embodiment illustrated in FIG. 11). The particle layer contains visible light-nonabsorbing particles (particles P in FIG. 11).

In one embodiment, the particle layer 32 includes a peeling layer disposed on the first substrate 31 and an adhesive layer disposed on the peeling layer. In this case, at least one of the peeling layer and the adhesive layer contains the particles R In one embodiment, the particle layer 32 includes a peeling layer and a receiving layer, and at least one of the peeling layer and the receiving layer contains particles P. The particles P are visible light-nonabsorbing particles.

Since the types and preferred embodiments of the visible light-nonabsorbing particles have been described above in the first aspect, the description thereof will be omitted here.

The particle layer preferably has a visible light-nonabsorbing particle content of 5% by mass or more and 60% by mass or less, more preferably 10% by mass or more and 50% by mass or less, even more preferably 15% by mass or more and 40% by mass or less.

(Peeling Layer)

In one embodiment, the particle layer 32 includes a peeling layer. The peeling layer is a layer provided for easily peeling the particle layer 32 from the first substrate 31 at the time of thermal transfer. Providing the peeling layer makes it possible to peel off the particle layer 32 from the first substrate 31 and reliably and easily transfer the particle layer 32 to the transfer-receiving article. The peeling layer is a layer that is to be peeled off from the first substrate 31 at the time of thermal transfer and then to be transferred onto the transfer-receiving article.

As described above, when the peeling layer is disposed between the first substrate 31 and the protective layer 37, the peeling layer in the particle layer 32 and the peeling layer disposed between the first substrate 31 and the protective layer 37 may be independent layers or an integrated layer.

In one embodiment, the peeling layer contains one or two or more resin materials. Examples of the resin materials include vinyl resins, such as ethylene-vinyl acetate copolymers and vinyl chloride-vinyl acetate copolymers, (meth) acrylic resins, cellulosic resins, and polyesters.

The peeling layer preferably has a resin material content of 10% by mass or more and 80% by mass or less, more preferably 15% by mass or more and 70% by mass or less, even more preferably 20% by mass or more and 60% by mass or less. Thereby, when the peeling layer contains the visible light-nonabsorbing particles, the dispersibility and retainability thereof can be improved.

When the peeling layer contains the visible light-nonabsorbing particles, the peeling layer preferably has a visible light-nonabsorbing particle content of 20% by mass or more and 90% by mass or less, more preferably 30% by mass or more and 80% by mass or less.

The peeling layer may contain one or two or more waxes. Examples of waxes include microcrystalline wax, carnauba wax, paraffin wax, Fischer-Tropsch wax, Japan wax, beeswax, spermaceti, Chinese wax, lanoline, shellac wax, candelilla wax, petrolactum, partially modified wax, fatty acid esters, and fatty acid amides.

The peeling layer preferably has a thickness of 0.1 μm or more and 3 μm or less, more preferably 0.5 μm or more and 2.5 μm or less. When the particles P are contained in the peeling layer, the thickness of the peeling layer is the thickness of a portion of the peeling layer, where the particles P are not present, on the first substrate 31.

The peeling layer can be formed by, for example, dispersing the above material in water or an appropriate solvent, or dissolving the above material in water or an appropriate solvent to prepare a coating liquid, applying the coating liquid onto the first substrate 31 to form a coating film, and drying the coating film. As an application means, for example, a known means, such as a roll coating method, a reverse roll coating method, a gravure coating method, a reverse gravure coating method, a bar coating method, or a rod coating method, can be used.

(Adhesive Layer)

In one embodiment, the particle layer 32 includes an adhesive layer. In one embodiment, the adhesive layer is a layer constituting the outermost surface of the particle layer 32. This can improve the adhesion of the particle layer 32 to the transfer-receiving article.

In one embodiment, the adhesive layer contains one or two or more thermoplastic resins that are softened by heating and exhibit adhesion. Examples of the thermoplastic resin include vinyl resins, such as poly(vinyl chloride), poly(vinyl acetate), and vinyl chloride-vinyl acetate copolymers; polyesters, (meth)acrylic resins, polyurethane, cellulosic resins, melamine resins, polyamides, polyolefins, and styrene resins.

As will be described later, the particle layer 32 is transferred onto the protective layer 37 that has been transferred to a transfer-receiving article. Thus, the same material is used for the thermoplastic resin in the adhesive layer of the particle layer 32 and the binder resin in the protective layer 37; this enables strong adhesion between the protective layer 37 and the particle layer 32.

The adhesive layer preferably has a thermoplastic resin content of 5% by mass or more and 70% by mass or less, more preferably 10% by mass or more and 60% by mass or less, even more preferably 15% by mass or more and 40% by mass or less. This makes it possible to further improve the adhesion between the adhesive layer and the transfer-receiving article. In addition, when the adhesive layer contains the visible light-nonabsorbing particles, the dispersibility and retainability thereof can be improved.

When the adhesive layer contains the visible light-nonabsorbing particles, the adhesive layer preferably has a visible light-nonabsorbing particle content of 5% by mass or more and 60% by mass or less, more preferably 10% by mass or more and 50% by mass or less, even more preferably 15% by mass or more and 40% by mass or less.

The adhesive layer preferably has a thickness of 0.1 μm or more and 3 μm or less, more preferably 0.5 μm or more and 2 μm or less. When the particles P are contained in the adhesive layer, the thickness of the adhesive layer is the thickness of a portion of the adhesive layer, where the particles P are not present, on the peeling layer or the like.

The adhesive layer can be formed by, for example, dispersing the above material in water or an appropriate solvent, or dissolving the above material in water or an appropriate solvent, to prepare a coating liquid, applying the coating liquid onto, for example, the peeling layer by the application means to form a coating film, and drying the coating film.

(Coloring Material Layer)

In one embodiment, the coloring material layer 33 contains a coloring material and a binder resin.

Examples of the coloring material include diarylmethane-based dyes, triarylmethane-based dyes, thiazole-based dyes, merocyanine dyes, pyrazolone dyes, methine-based dyes, indoaniline-based dyes, pyrazolomethine-based dyes, azomethine-based dyes, such as acetophenone azomethine, pyrazoloazomethine, imidazole azomethine, imidazoazomethine, and pyridone azomethine, xanthene-based dyes, oxazine-based dyes, cyanostyrene-based dyes, such as dicyanostyrene and tricyanostyrene, thiazine-based dyes, azine-based dyes, acridine-based dyes, benzene azo-based dyes, azo-based dyes, such as pyridone azo, thiophene azo, isothiazole azo, pyrrole azo, pyrazole azo, imidazole azo, thiadiazole azo, triazole azo, and disazo, spiropyran-based dyes, indolinospiropyran-based dyes, fluoran-based dyes, rhodamine lactam-based dyes, naphthoquinone-based dyes, anthraquinone-based dyes, and quinophthalone-based dyes. The coloring material layer 33 may contain one coloring material alone or may contain two or more coloring materials.

As the binder resin, a resin having a certain degree of heat resistance and having an appropriate affinity for the sublimation dye can be appropriately selected and used. Examples of the binder resin include cellulosic resins, such as nitrocellulose, cellulose acetate butyrate, and cellulose acetate propionate, vinyl resins, such as poly(vinyl acetate), poly(vinyl butyral), and poly(vinyl acetal), (meth)acrylic resins, such as poly(meth)acrylates and poly(meth)acrylamide, polyurethanes, polyamides, and polyesters. The coloring material layer 33 may contain one binder resin alone or may contain two or more binder resins.

The coloring material layer 33 may contain one or two or more additives, such as inorganic particles and organic particles. Examples of the inorganic particles include talc, carbon black, aluminum, and molybdenum disulfide. Examples of the organic particles include polyethylene wax and silicone resin particles.

The coloring material layer 33 may contain one or two or more of release materials. Examples of the release materials include modified or unmodified silicone oils (including what is called silicone resins), phosphoric esters, and fatty acid esters.

The coloring material layer 33 can be formed by, for example, dissolving or dispersing the binder resin, the coloring material, and the additive and the release material added as necessary in an appropriate solvent to prepare a coloring material layer coating liquid, applying this coating liquid onto the first substrate 31 or any layer disposed on the first substrate 31, and drying the coating liquid.

The coloring material layer 33 typically has a thickness of 0.2 μm or more and 2.0 μm or less.

(Protective Layer)

In one embodiment, the protective layer 37 includes one or two or more binder resins. Examples of the binder resin include polyesters, polyester urethane resins, polycarbonates, (meth)acrylic resins, epoxy resins, (meth)acrylic urethane resins, resins obtained by modifying these resins with silicone, and a mixture of these resins.

The protective layer 37 may contain an ultraviolet absorbing resin or an actinic radiation curable resin. The term "actinic radiation" refers to rays that chemically act on actinic radiation-curable resins to promote polymerization, and specifically, refers to, for example, visible light, ultraviolet rays, X-rays, electron beams, α-rays, β-rays, and γ-rays.

The binder resin content of the protective layer 37 is not particularly limited. The binder resin content is preferably 20% by mass or more, more preferably 30% by mass or more, based on the total solid content of the protective layer 37. The upper limit of the binder resin content is not particularly limited. The upper limit thereof is 100% by mass.

In addition to the binder resin, the protective layer 37 may contain other materials, such as various fillers, a fluorescent whitening material, and an ultraviolet absorbing material for improving weather resistance.

The protective layer 37 can be formed by, for example, dissolving or dispersing the binder resin illustrated above and an additive added as necessary in an appropriate solvent to prepare a protective layer coating liquid, applying this coating liquid onto the first substrate 31 or any layer disposed on the first substrate 31, and drying the coating liquid.

The protective layer 37 typically has a thickness of 0.5 μm or more and 10 μm or less.

To improve the transferability of the protective layer 37, a peeling layer can be disposed between the first substrate 31 and the protective layer 37. The material and thickness of the peeling layer can be the same as those of the peeling layer of the particle layer 32. Alternatively, a release layer may be disposed instead of the peeling layer.

To improve the adhesion between the transfer-receiving article and the protective layer 37, an adhesive layer may be disposed on the protective layer 37. The material and thickness of the adhesive layer can be the same as those of the adhesive layer of the particle layer 32.

(Back Layer)

Examples of the material of the back layer 38 include, but are not limited to, natural or synthetic resins, such as cellulosic resins, e.g., cellulose acetate butyrate and cellulose acetate propionate; vinyl resins, e.g., poly(vinyl butyral) and poly(vinyl acetal); (meth)acrylic resins, e.g., poly(methyl methacrylate), poly(ethyl acrylate), polyacrylamide, and acrylonitrile-styrene copolymers; polyamides; poly (amide-imide); polyesters, polyurethanes; and silicone-modified or fluorine-modified polyurethanes. The back layer 38 may contain one of these resins alone, or may contain two or more of them.

The back layer 38 may contain one or two or more solid or liquid lubricants. Examples of the lubricants include various waxes, such as polyethylene wax, higher aliphatic alcohols, organopolysiloxanes, anionic surfactants, cationic surfactants, nonionic surfactants, fluorinated surfactants, organic carboxylic acids and their derivatives, metal soaps, fluorine-based resins, silicone-based resins, and particles of inorganic compounds, such as talc and silica.

The back layer typically has a lubricant content of 5% by mass or more and 50% by mass or less, preferably 10% by mass or more and 40% by mass or less.

The back layer can be formed by, for example, dissolving or dispersing a resin, a lubricant added as necessary, and so forth in an appropriate solvent to prepare a back layer coating liquid, applying this coating liquid onto the first substrate 31, and drying the coating liquid.

The back layer preferably has a thickness of 0.5 μm or more and 10 μm or less.

<Image-Receiving Sheet>

Figure 12:
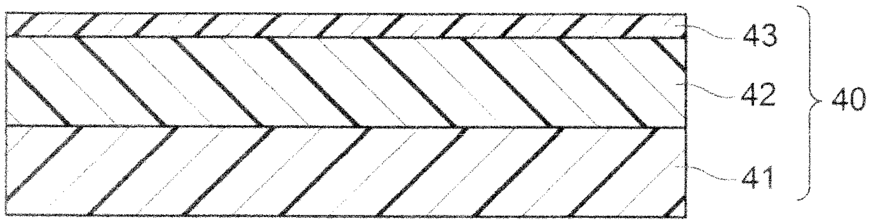
FIG. 12 is a cross-sectional view of an image-receiving sheet according to the embodiment.

As illustrated in FIG. 12, an image-receiving sheet 40 as a transfer-receiving article includes a second substrate 41, a thermal recess-forming layer 42, and a receiving layer 43, which are stacked in that order. The thermal recess-forming layer 42 may have a multilayer structure. The image-receiving sheet 40 may include a freely-selected layer, such as an adhesive layer, between freely-selected layers, for example, between the second substrate 41 and the thermal recess-forming layer 42 or between layers included in the thermal recess-forming layer 42 having a multilayer structure. The image-receiving sheet 40 may include a primer layer between the thermal recess-forming layer 42 and the receiving layer 43.

Each layer of the image-receiving sheet 40 will be described.

(Substrate)

Examples of the second substrate 41 include paper substrates and films composed of resins (hereinafter, referred to simply as "resin films"). Examples of paper substrates include condenser paper, glassine paper, parchment paper, synthetic paper, wood-free paper, art paper, coated paper, uncoated paper, cast coated paper, wallpaper, cellulose fiber paper, synthetic resin internally added paper, lining paper, and impregnated paper (synthetic resin-impregnated paper, emulsion-impregnated paper, and synthetic rubber latex-impregnated paper). Examples of the resins include polyesters, such as poly(ethylene terephthalate), poly(butylene terephthalate), and poly(ethylene naphthalate); polyolefins, such as polyethylenes, polypropylenes, and polymethylpentene; vinyl resins, such as poly(vinyl chloride), poly(vinyl acetate), and vinyl chloride-vinyl acetate copolymers; (meth)acrylic resins, such as polyacrylates, polymethacrylates, and poly(methyl methacrylate); styrene resins, such as polystyrenes; polycarbonates; and ionomer resins.

When the second substrate 41 is a resin film, the resin film may be a stretched film or an unstretched film. The resin film is preferably uniaxially or biaxially stretched film from the viewpoint of mechanical strength.

The foregoing laminate of the paper substrate or resin film can also be used as the second substrate 41. The laminate can be produced by, for example, a dry lamination method, a wet lamination method, or an extrusion method.

The second substrate 41 preferably has a thickness of 50 μm or more and 500 μm or less, more preferably 75 μm or more and 500 μm or less, even more preferably 100 μm or more and 500 μm or less, from the viewpoint of mechanical strength.

(Thermal Recess-Forming Layer)

The image-receiving sheet 40 includes the thermal recess-forming layer 42. The image-receiving sheet 40 is heated from the receiving layer 43 side under a high-temperature condition with a thermal head to form a recess in the thermal recess-forming layer 42, so that a printed material to be produced can have a high three-dimensional effect. For example, when the recess is formed in the thermal recess-forming layer 42, a region of a relative protrusion is formed. By forming the recess in such a manner that the protrusion represents, for example, a pattern or a character, the design properties of the printed material can be improved.

The thermal recess-forming layer 42 may have a single-layer structure or may have a multilayer structure. The thermal recess-forming layer 42 preferably has a thickness of 40 μm or more, more preferably 80 μm or more. This can improve the depth of a recess formed and the ease of formation of the recess. The thermal recess-forming layer 42 preferably has a thickness of 200 μm or less from the viewpoint of transportability and processability in a thermal transfer printing device, In one embodiment, the thermal recess-forming layer 42 is a porous layer including at least one of a porous film having fine pores therein and a hollow particle-containing layer.

When the thermal recess-forming layer 42 is a porous layer having a single-layer structure, the porosity is preferably 20% or more and 80% or less, more preferably 30% or more and 60% or less. This can improve the depth of a recess formed and the ease of formation of the recess. Moreover, the image density of an image formed on the receiving layer 43 can be improved. Furthermore, the embossing-suppressing properties during printing can be improved.

When the thermal recess-forming layer 42 is a porous layer having a multilayer structure, the porosity of a first thermal recess-forming layer (thermal recess-forming layer disposed closest to the receiving layer) is preferably smaller than the porosity of the other thermal recess-forming layers. This can improve embossing-suppressing properties during printing.

The first thermal recess-forming layer preferably has a porosity of 10% or more and 60% or less, more preferably 20% or more and 50% or less. This can improve the depth of a recess formed and the ease of formation of the recess. Furthermore, the embossing-suppressing properties during printing can be improved.

The thermal recess-forming layers other than the first thermal recess-forming layer preferably have an average porosity of 10% or more and 80% or less, more preferably 20% or more and 80% or less. This facilitates the formation of a recess at the first thermal recess-forming layer and can improve the embossing-suppressing properties during printing.

In the present disclosure, the porosity is calculated by (1−specific gravity of thermal recess-forming layer/specific gravity of resin material of thermal recess-forming layer)×100. When the specific gravity of the resin material of the thermal recess-forming layer 42 is unknown, the porosity is calculated as follows: A cross-sectional image of the thermal recess-forming layer is acquired with a scanning electron microscope (trade name: S3400N, available from Hitachi High Technologies Corporation). The porosity is calculated from ((b)/(a))×100, where (a) is the total area of the cross-sectional image, and (b) is the area occupied by pores (vacancies).

The first thermal recess-forming layer preferably has a thickness of 20 μm or more and 150 μm or less, more preferably 30 μm or more and 130 μm or less, even more preferably 30 μm or more and 100 μm or less. This can improve the depth of a recess formed and the ease of formation of the recess.

The sum of the thicknesses of the thermal recess-forming layers other than the first thermal recess-forming layer is preferably 10 μm or more and 180 μm or less, more preferably 20 μm or more and 150 μm or less, even more preferably 20 μm or more and 130 μm or less. This can improve the image density of an image formed on the receiving layer.

In one embodiment, the porous film contains one or two or more resin materials. Examples of the resin materials include polyolefins, such as polyethylenes and polypropylenes; vinyl resins, such as poly(vinyl acetate), vinyl chloride-vinyl acetate copolymers, and ethylene-vinyl acetate copolymers; polyesters, such as poly(ethylene terephthalate) and polybutylene terephthalate); styrene resins; and polyamides. Polypropylenes are particularly preferred from the viewpoints of film smoothness, thermal insulation properties, and cushioning properties.

The porous film may contain one or two or more additives. Examples of the additive include plasticizers, fillers, ultraviolet stabilizers, anti-coloring materials, surfactants, fluorescent whitening materials, delusterants, deodorants, flame retardants, weathering materials, antistatic materials, yarn friction reducers, slip materials, antioxidants, ion exchangers, dispersants, ultraviolet absorbers, and coloring materials, such as pigments and dyes.

The porous film can be produced by a known method. For example, the porous film can be produced by kneading organic or inorganic particles incompatible with the above-described resin material and forming the resulting mixture into a film. In one embodiment, the porous film can be produced by forming a mixture containing a first resin material and a second resin material having a higher melting point than the first resin material into a film.

The porous film is not limited to the porous film produced by the above method, and a commercially available porous film may also be used.

The porous film can be laminated on the second substrate 41 with an adhesive layer provided therebetween. Multiple porous films may be laminated on the second substrate 41 with adhesive layers.

The hollow particle-containing layer is a layer containing hollow particles and a binder material.

The hollow particles are not particularly limited as long as they can satisfy the depth condition of the recess formed by heating the image-receiving sheet 40. The hollow particles may be organic hollow particles or inorganic hollow particles. The organic hollow particles are preferred from the viewpoint of dispersibility. The hollow particles may be foamed particles or non-foamed particles.

In one embodiment, the organic hollow particles are composed of one or two or more resin materials. Examples of the resin material include styrene resins, such as cross-linked styrene-acrylic resins, (meth)acrylic resins, phenolic resins, fluororesins, polyacrylonitriles, imide resins, and polycarbonates.

In one embodiment, the organic hollow particles can be produced by encapsulating a foaming material, such as butane gas, in, for example, resin particles and heating and foaming the particles. In one embodiment, the organic hollow particles can also be produced by emulsion polymerization. Commercially available organic hollow particles may also be used.

In one embodiment, the hollow particle-containing layer contains one or two or more binder materials. Examples of the binder materials include polyurethanes, polyesters, cellulosic resins, vinyl resins, (meth)acrylic resins, polyolefins, styrene resins, gelatin and derivatives thereof, styrene acrylate, poly(vinyl alcohol), poly(ethylene oxide), polyvinylpyrrolidone, pullulan, dextran, dextrin, poly(acrylic acid) and salts thereof, agar, κ-carrageenan, λ-carrageenan, ι-carrageenan, casein, xanthan gum, locust bean gum, alginic acid, and gum arabic.

The hollow particle-containing layer may contain one or two or more additives described above.

The hollow particle-containing layer can be formed by, for example, dispersing or dissolving the above-described material in an appropriate solvent to prepare a coating liquid, applying the coating liquid to, for example, the second substrate 41 by a known means, such as a roll coating method, a reverse roll coating method, a gravure coating method, a reverse gravure coating method, a bar coating method, or a rod coating method, to form a coating film, and drying the coating film.

(Receiving Layer)

The receiving layer 43 is a layer that receives the coloring material (sublimation dye) transferred from the coloring material layer 33 included in the thermal transfer sheet 30 and that retains the formed image.

In one embodiment, the receiving layer 43 contains one or two or more resin materials. Each of the resin materials is not limited as long as it is a resin that is easily dyed with a dye. Examples thereof include polyolefins, vinyl resins, (meth)acrylic resins, cellulosic resins, polyesters, polyamides, polycarbonates, styrene resins, polyurethanes, and ionomer resins.

The receiving layer 43 preferably has a resin material content of 80% by mass or more and 98% by mass or less, more preferably 90% by mass or more and 98% by mass or less.

In one embodiment, the receiving layer 43 contains one or two or more release materials. This enables an improvement in the releasability between the receiving layer 43 and the thermal transfer sheet 30. Examples of the release materials include solid waxes, such as polyethylene wax, amide wax, and Teflon (registered trademark) powder, fluorinated or phosphate surfactants, silicone oils, various modified silicone oils, such as reactive silicone oils and curable silicone oils, and various silicone resins. As the above release material, a modified silicone oil is preferred.

Examples of the modified silicone oil that can be preferably used include amino-modified silicones, epoxy-modified silicones, aralkyl-modified silicones, epoxy-aralkyl-modified silicones, alcohol-modified silicones, vinyl-modified silicones, and urethane-modified silicones. Epoxy-modified silicones, aralkyl-modified silicones, and epoxy-aralkyl-modified silicones are particularly preferred.

The receiving layer 43 preferably has a release material content of 0.5% by mass or more and 20% by mass or less, more preferably 0.5% by mass or more and 10% by mass or less. This can improve the releasability between the receiving layer 43 and the thermal transfer sheet 30 while maintaining the transparency of the receiving layer 43.

The receiving layer 43 preferably has a thickness of 0.5 μm or more and 20 μm or less, more preferably 1 μm or more and 10 μm or less. This can improve the image density of an image formed on the receiving layer 43.

The receiving layer 43 can be formed by, for example, dispersing or dissolving the above-described material in an appropriate solvent to prepare a coating liquid, applying the coating liquid onto the thermal recess-forming layer 42 by a known means, such as a roll coating method, a reverse roll coating method, a gravure coating method, a reverse gravure coating method, a bar coating method, or a rod coating method, to form a coating film, and drying the coating film.

<Method for Producing Printed Material>

A method for producing a printed material will be described below with reference to FIGS. 13 to 15.

The thermal transfer sheet 30 and the image-receiving sheet 40 are provided. The thermal transfer sheet 30 and the image-receiving sheet 40 are superimposed in such a manner that the coloring material layer 33 and the receiving layer 43 face each other. The thermal transfer sheet 30 is heated from the back layer 38 side with, for example, a thermal head of a thermal transfer printer to thermally transfer the coloring material contained in the coloring material layer 33, thereby forming an image on the receiving layer 43.

Subsequent to the image formation process, a protective layer transfer process is performed. In the present embodiment, the protective layer transfer process also serves as a process for forming a recess in the image-receiving sheet 40.

In the protective layer transfer process, the thermal transfer sheet 30 and the image-receiving sheet 40 are superimposed in such a manner that the protective layer 37 and the receiving layer 43 face each other. The thermal transfer sheet 30 is heated from the back layer 38 side with the thermal head. At this time, the energy applied from the thermal head 1 is adjusted in accordance with a recess formation pattern. The image-receiving sheet 40 is heated by applying higher applied energy to a region where a recess is to be formed than a region where no recess is to be formed. For example, the applied energy in the region where a recess is to be formed is more than 1 time and 5 or less times, preferably 2 or more times and 3 or less times, the applied energy in a region where no recess is to be formed.

Figure 13:
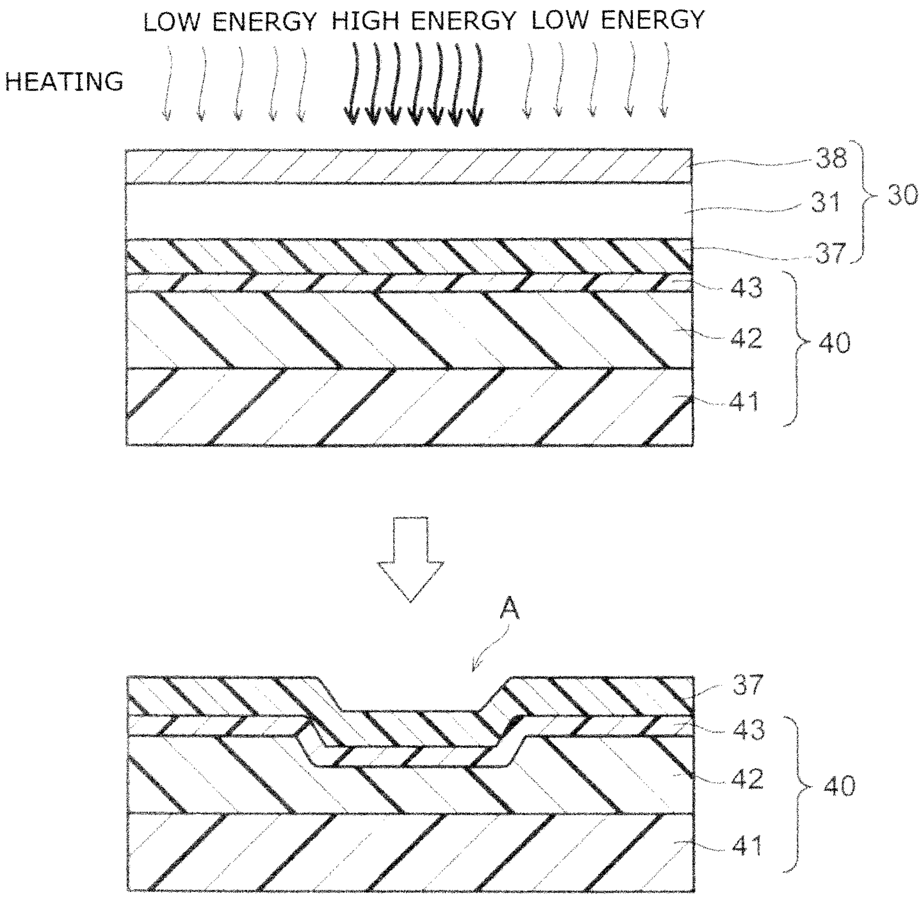
FIG. 13 is a process cross-sectional view illustrating a recess formation process according to the embodiment.

As illustrated in FIG. 13, in the region where the applied energy is low, the protective layer 37 is transferred from the thermal transfer sheet 30. In the region where the applied energy is high, the protective layer 37 is transferred from the thermal transfer sheet 30. The thermal recess-forming layer 42 is recessed. The receiving layer 43 and the protective layer 37 on the thermal recess-forming layer 42 are also recessed to form a recess A on the surface. In the region where no recess is formed, the image-receiving sheet 40 (thermal recess-forming layer 42) does not undergo plastic deformation. Thus, the thickness of the image-receiving sheet 40 after transfer of the protective layer is substantially the same as the thickness before printing. In the region where a recess is to be formed, the image-receiving sheet 40 undergoes plastic deformation to form a recess (recess A) having a depth of 5 μm or more on the surface.

After the protective layer transfer and recess formation processes, a particle layer transfer process is performed. In the particle layer transfer process, the thermal transfer sheet 30 and the image-receiving sheet 40 are superimposed in such a manner that the particle layer 32 and the protective layer 37 disposed on the image-receiving sheet 40 face each other. The thermal transfer sheet 30 is heated from the back layer 38 side with the thermal head. The particle layer 32 is transferred from the image-receiving sheet 40 onto the protective layer 37 to produce a printed material. At this time, the applied energy from the thermal head is adjusted in such a manner that the particle layer 32 is not transferred to the recess A but is transferred to at least part of a region other than the recess A, that is, of a relative protrusion.

Figure 14:
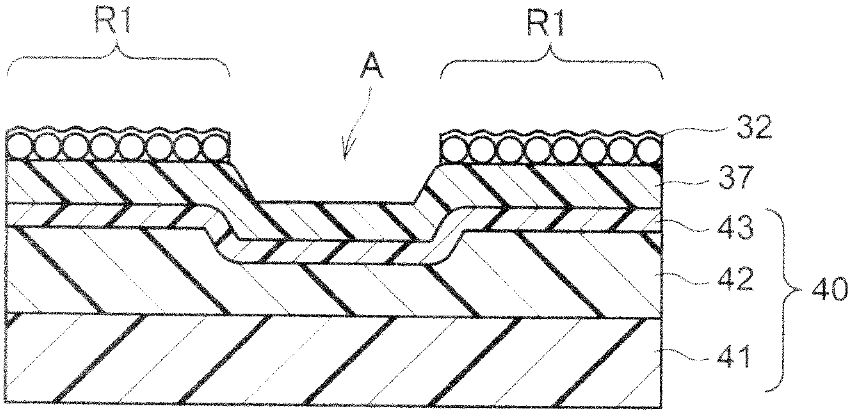
FIG. 14 is a cross-sectional view of a printed material according to the embodiment.

For example, as illustrated in FIG. 14, the particle layer 32 is transferred to the whole of region R1, which is a region other than the recess A. By transferring the particle layer 32, the difference in level from the depressed portion of the recess A can be easily recognized by tactile sensation. Thus, a printed material having a high three-dimensional effect can be obtained.

Figure 15:
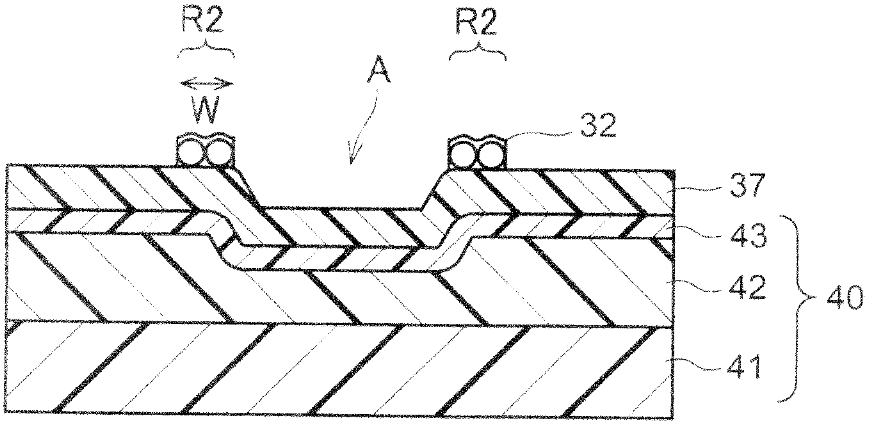
FIG. 15 is a cross-sectional view of a printed material according to the embodiment.

As illustrated in FIG. 15, the particle layer 32 may be transferred only to a peripheral region R2 of the recess A. By transferring the particle layer 32 only to the peripheral region R2, it is possible to emphasize a feeling of unevenness with tactile sensation. The width W of the peripheral region is preferably about 0.1 mm or more and about 5 mm or less. The peripheral region R2 to which the particle layer 32 is transferred need not surround the recess A. In a region other than the recess A, the peripheral region R2 may be a part of the boundary portion with the recess A.

The reduced peak height (Spk) specified in ISO 25178-2:2012 on the surface of the particle layer 32 transferred onto the protective layer 37 is preferably 0.6 μm or more. In this case, the protrusion and/or recess can be easily detected when the surface of the printed material is rubbed with a finger. Spk is more preferably 0.6 μm or more and 2.0 μm or less, even more preferably 0.7 μm or more and 1.2 μm or less.

The recess may be formed at one place, or recesses may be formed at multiple places.

In the above embodiment, the protective layer transfer process and the recess formation process may be performed separately. For example, the protective layer 37 is transferred from the thermal transfer sheet 30 onto the receiving layer 43 of the image-receiving sheet 40. Subsequently, the thermal transfer sheet 30 and the image-receiving sheet 40 are superimposed in such a manner that the used protective layer formation region of the thermal transfer sheet 30 after the protective layer 37 has been transferred faces the protective layer 37 that has been transferred to the image-receiving sheet 40. Thermal energy is applied from the thermal head to the recess formation region of the image-receiving sheet 40 through the used protective layer formation region. In the used protective layer formation region, the first substrate 31 of the thermal transfer sheet 30 (the release layer when the release layer is disposed) is exposed.

The order of the protective layer transfer process, the recess formation process, and the particle layer transfer process is not particularly limited. When the protective layer is transferred after the transfer of the particle layer, however, the protrusion feeling of the particle layer can be alleviated by the protective layer. Thus, the particle layer transfer process is preferably performed after the protective layer transfer process and the recess formation process.

In the above-described embodiment, the configuration in which the coloring material layer 33, the protective layer 37, and the particle layer 32 are disposed at the same thermal transfer sheet has been described. However, any of the layers may be disposed at a different thermal transfer sheet, or different layers may be disposed at different thermal transfer sheets.

In the above-described embodiment, the thermal recess-forming layer 42 of the image-receiving sheet 40 is recessed to form the protrusion and/or recess on the surface of the image-receiving sheet 40. However, instead of the thermal recess-forming layer 42, a thermal protrusion-forming layer (foaming layer) having a thickness of 5 μm or more and containing foamable particles may be disposed, and the foamable particles may be allowed to foam to form a protrusion, thereby providing the protrusion and/or recess on the surface of the image-receiving sheet 40. In this case, a protrusion formation region is heated at an energy value (energy of more than 1 time and 5 or less times, preferably 2 or more times and 3 or less times) more than or equal to a predetermined value that is higher than that of a region other than the protrusion formation region. The formation of the protrusion may be performed along with the transfer of the protective layer 37, or may be subjected to irradiation with laser light or ultraviolet light after the transfer of the protective layer 37. The height of the protrusion formed is 5 μm or more.

The thermal protrusion-forming layer is a layer containing foamable hollow particles and a binder material. Preferably, the foamable hollow particles have the property of expanding only when heated at a predetermined temperature or higher and maintaining the expanded state even when the temperature is reduced thereafter.

Examples of a material having the property that the degree of expansion is largely different between a low-temperature region and a high-temperature region with a predetermined temperature as a boundary include thermally expandable hollow particles each having a hollow portion and containing an expanding agent inside the outer shell composed of, for example, a thermoplastic resin. By adjusting the relationship between the softening point of the outer shell portion of each hollow particle and the vapor pressure of the expanding agent composed of, for example, a volatile organic solvent contained in the hollow portion, various hollow particles having different temperatures at which foaming and expansion start, different temperatures at which maximum expansion is obtained, and so forth, are commercially available.

Foamable hollow particles are also referred to as, for example, thermally expandable microspheres and thermally expandable microballoons. Regarding the material of the foamable hollow particles, for example, foamed organic particles that are foams of, for example, a crosslinked styrene-acrylic resin and hollow inorganic glass bodies can be used as the hollow particles.

Regarding the size of the foamable hollow particles, the average particle size before thermal expansion is in the range of, for example, 0.1 μm or more and 90 μm or less, preferably in the range of 6 μm or more and 18 μm or less.

With respect to the degree of hollowness of the foamable hollow particles, the average hollowness in the thermally expandable region is preferably in the range of 30% or more and 80% or less, more preferably in the range of 50% or more and 80% or less.

The protrusion and/or recess can be formed on the surface of the image-receiving sheet by adjusting the energy applied to the image-receiving sheet including the thermal protrusion-and/or-recess forming layer (thermal recess-forming layer or thermal protrusion-forming layer). For example, when the image-receiving sheet includes the thermal recess-forming layer, a recess is formed in a region to which high energy is applied, and a region where no recess is formed is a relative protrusion, thereby forming the protrusion and/or recess on the surface. When the image-receiving sheet includes the thermal protrusion-forming layer, a protrusion is formed in a region to which high energy is applied, and a region where no protrusion is formed is a relative recess, thereby forming the protrusion and/or recess on the surface. The particle layer 32 is not transferred to the recess, and the particle layer 32 is transferred to at least part of a region (protrusion) other than the recess. As a result, the difference in level between the portion to which the particle layer has been transferred and the depressed portion of the recess can be easily recognized by tactile sensation. Thus, a printed material having a high three-dimensional effect can be obtained.

The present disclosure relates to, for example, the following [1] to [23].

[1] A thermal transfer sheet, including a substrate and a transfer layer, in which, after transfer, the transfer layer has a reduced peak height (Spk) of 0.6 μm or more.

[2] The thermal transfer sheet described in [1], in which the transfer layer contains visible light-nonabsorbing particles.

[3] The thermal transfer sheet described in [2], in which the visible light-nonabsorbing particles are glass particles.

[4] The thermal transfer sheet described in [2] or [3], in which the visible light-nonabsorbing particles are hollow particles with shells of glass.

[5] The thermal transfer sheet described in any one of [2] to [4], in which the visible light-nonabsorbing particles have an average particle size of 2 μm or more and 20 μm or less.

[6] The thermal transfer sheet described in any one of [1] to [5], in which the transfer layer includes at least a peeling layer and an adhesive layer, and the adhesive layer contains a lubricant.

[7] The thermal transfer sheet described in any one of [1] to [5], in which the transfer layer includes at least a peeling layer and a receiving layer.

[8] A printed material, including a transfer-receiving article and a transfer layer, in which a surface of the transfer layer side has a reduced peak height (Spk) of 0.6 μm or more.

[9] The printed material described in [8], in which the transfer layer contains visible light-nonabsorbing particles.

[10] The printed material described in [8] or [9], further including a protective layer on the transfer layer.

[11] A method for producing a printed material using a thermal transfer sheet including a particle layer disposed on a first substrate and an image-receiving sheet including a thermal protrusion-and/or-recess forming layer and a receiving layer stacked in that order on a second substrate, the receiving layer including an image that has been formed, the method including the steps of heating the image-receiving sheet to form a protrusion and/or a recess at the image-receiving sheet, and heating the thermal transfer sheet to transfer the particle layer to at least part of the protrusion of the image-receiving sheet.

[12] The method for producing a printed material described in [11], in which after the formation of the protrusion and/or the recess, the particle layer is transferred.

[13] The method for producing a printed material described in [11] or [12], further including a step of heating a thermal transfer sheet including a protective layer to transfer the protective layer onto the receiving layer, in which the protrusion and/or the recess are formed after the transfer of the protective layer or simultaneously with the transfer of the protective layer.

[14] The method for producing a printed material described in any one of [11] to [13], in which the particle layer is transferred to the entirety of the protrusion of the image-receiving sheet.

[15] The method for producing a printed material described in any one of [11] to [13], in which, on the protrusion of the image-receiving sheet, the particle layer is transferred to a peripheral region of the recess.

[16] The method for producing a printed material described in any one of [11] to [15], in which the particle layer contains visible light-nonabsorbing particles.

[17] The method for producing a printed material described in any one of [11] to [16], in which the particle layer transferred to the image-receiving sheet has a reduced peak height (Spk) of 0.6 μm or more.

[18] The method for producing a printed material described in any one of [11] to [17], in which the thermal protrusion-and/or-recess forming layer is a thermal recess-forming layer having a thickness of 40 μm or more, and a recess having a depth of 5 μm or more is formed at the image-receiving sheet.

[19] The method for producing a printed material described in [18], in which the thermal recess-forming layer includes at least one of a porous film and a hollow particle-containing layer.

[20] The method for producing a printed material described in any one of [11] to [17], in which the thermal protrusion-and/or-recess forming layer is a thermal protrusion-forming layer having a thickness of 5 μm or more, and a protrusion having a height of 5 μm or more is formed at the image-receiving sheet.

[21] The method for producing a printed material described in [20], in which the thermal protrusion-forming layer contains foamable hollow particles.

[22] A combination of a thermal transfer sheet and an image-receiving sheet, in which the thermal transfer sheet includes a first substrate and a particle layer disposed on a surface of the first substrate, the particle layer contains visible light-nonabsorbing particles, the image-receiving sheet includes a second substrate, a thermal recess-forming layer disposed on the second substrate, and a receiving layer disposed on the thermal recess-forming layer, and the thermal recess-forming layer includes at least one of a porous film and a hollow particle-containing layer.

[23] A combination of a thermal transfer sheet and an image-receiving sheet, in which the thermal transfer sheet includes a first substrate and a particle layer disposed on a surface of the first substrate, the particle layer contains visible light-nonabsorbing particles, the image-receiving sheet includes a second substrate, a thermal protrusion-forming layer disposed on the second substrate, and a receiving layer disposed on the thermal protrusion-forming layer, and the thermal protrusion-forming layer contains foamable hollow particles.

EXAMPLES

A thermal transfer sheet according to the first aspect of the present disclosure will be described in more detail with reference to examples. The thermal transfer sheet according to the first aspect of the present disclosure, however, is not limited to these examples.

Example 1

(Production of Thermal Transfer Sheet)

A PET film having a thickness of 4.5 μm was provided.

A coating liquid, having the following composition, for forming a back layer was applied to one surface of the PET film and dried to form a back layer.

<Coating Liquid for Forming Back Layer>

| | |
|---|---|
| Poly(vinyl butyral) resin (S-LEC (registered trademark) BX-1, available from Sekisui Chemical Co., Ltd.) | 2 parts by mass |
| Polyisocyanate (Burnock (registered trademark) D750, available from DIC Corporation) | 9.2 parts by mass |
| Phosphate-based surfactant (Plysurf (registered trademark) A208N, available from Dai-ichi Kogyo Seiyaku Co., Ltd.) | 1.3 parts by mass |
| Talc (Micro Ace (registered trademark) P-3, available from Nippon Talc Co., Ltd.) | 0.3 parts by mass |
| Methyl ethyl ketone (MEK) | 43.6 parts by mass |
| Toluene | 43.6 parts by mass |

A coating liquid, having the following composition, for forming a peeling layer was applied to the other surface of the PET film and dried to form a peeling layer having a thickness of 1.5 μm.

(Coating Liquid for Forming Peeling Layer)

| | |
|---|---|
| (Meth)acrylic resin (Dianal (registered trademark) BR-83, available from Mitsubishi Chemical Corporation) | 2.5 parts by mass |

-continued

| | |
|---|---|
| Polyester (Vylon (registered trademark) 200, available from Toyobo Co., Ltd.) | 2.5 parts by mass |
| Toluene | 45 parts by mass |
| MEK | 50 parts by mass |

A coating liquid, having the following composition, for forming an adhesive layer was applied to the peeling layer and dried to form an adhesive layer having a thickness of 1.2 μm.

<Coating Liquid for Forming Adhesive Layer>

| | |
|---|---|
| Vinyl chloride-vinyl acetate copolymer (Solbin (registered trademark) CNL, Mn: 16,000, Tg: 76° C., available from Nissin Chemical Industry Co., Ltd.) | 5 parts by mass |
| Glass particles A (Spherical (registered trademark) 110P8 (hollow particles), average particle size: 12 μm, density: 1.10 g/cm$^3$, available from Potters-Ballotini Co., Ltd.) | 5 parts by mass |
| Toluene | 45 parts by mass |
| MEK | 45 parts by mass |

Examples 2 to 13 and Comparative Examples 1 and 2

Thermal transfer sheets were produced as in Example 1, except that the compositions of the peeling layers and the adhesive layers included in the thermal transfer sheets were changed as given in Table 1.

The details of each component in Table 1 are listed below.

Poly(vinyl butyral): available from Sekisui Chemical Co., Ltd. S-LEC (registered trademark) BL-2H Lubricant A: available from Nissin Chemical Industry Co., Ltd. epoxy-modified silicone oil, K1800U Lubricant B: zinc stearate, SZ-PF, available from Sakai Chemical Industry Co., Ltd.

Glass particles B: EMB-20 (solid particles), average particle size: 10 μm, density: 2.6 g/cm$^3$, available from Potters-Ballotini Co., Ltd.

Glass particles C: EMB-10 (solid particles), average particle size: 5 μm, density: 2.6 g/cm$^3$, available from Potters-Ballotini Co., Ltd.

Example 14

A PET film having a thickness of 4.5 μm was provided. The coating liquid for forming a back layer described in Example 1 was applied to one surface of the PET film and dried to form a back layer. The coating liquid for forming a peeling layer described in Example 1 was applied to the other surface of the PET film and dried to form a peeling layer having a thickness of 1.5 μm.

The coating liquid for forming an adhesive layer described in Example 2 and a coating liquid, having the following composition, for forming a protective layer were frame sequentially applied to the same surface of the peeling layer to a dry thickness of 1.2 μm and 0.5 μm, respectively, and dried to form an adhesive layer and a protective layer.

<Coating Liquid for Forming Protective Layer>

| | |
|---|---|
| Polyester (available from Unitika Ltd., Elitel (registered trademark) UE-9885, number- | 10 parts by mass |

-continued

| | |
|---|---|
| average molecular weight: 6,000, Tg: 82° C.) | |
| Toluene | 45 parts by mass |
| MEK | 45 parts by mass |

<Thermal Transfer Printer>

Thermal head: Kyocera Corporation, KEE-57-12GAN2-STA

Average resistance of heating element: 3,303Ω

Print density in main-scanning direction: 300 dpi

Print density in sub-scanning direction: 300 dpi

TABLE 1

| | Composition of peeling layer [% by mass] | | | | | Composition of adhesive layer [% by mass] | | | | | | | Glass particle content of transfer layer [% by mass] | Protective layer |
|---|---|---|---|---|---|---|---|---|---|---|---|---|---|---|
| | Glass particles | | | Resin material | | Glass particles | | | Vinyl chloride-vinyl acetate copolymer | Poly(vinyl butyral) | Lubricant | | | |
| | A | B | C | (Meth)acrylic resin | Polyester | A | B | C | | | A | B | | |
| Example 1 | | | | 50 | 50 | 50 | | | 50 | | | | 31 | no |
| Example 2 | | | | 50 | 50 | 25 | | | 25 | | 50 | | 19 | no |
| Example 3 | | | | 50 | 50 | 25 | | | 25 | | | 50 | 19 | no |
| Example 4 | | | | 50 | 50 | 17 | | | 50 | | 33 | | 14 | no |
| Example 5 | | | | 50 | 50 | 30 | | | 11 | | 59 | | 22 | no |
| Example 6 | | | | 50 | 50 | | 20 | | 40 | | 40 | | 13 | no |
| Example 7 | | | | 50 | 50 | | | 20 | 40 | | 40 | | 13 | no |
| Example 8 | 75 | | | 12.5 | 12.5 | | | | 33 | | 67 | | 47 | no |
| Example 9 | 50 | | | 25 | 25 | | | | 33 | | 67 | | 36 | no |
| Example 10 | 33 | | | 33 | 33 | | | | 33 | | 67 | | 26 | no |
| Example 11 | | 33 | | 33 | 33 | | | | 50 | | 50 | | 16 | no |
| Example 12 | | | 33 | 33 | 33 | | | | 50 | | 50 | | 16 | no |
| Example 13 | 50 | | | 25 | 25 | 25 | | | 25 | | 50 | | 35 | no |
| Example 14 | | | | 50 | 50 | 25 | | | 25 | | 50 | | 19 | yes |
| Comparative example 1 | | | | 50 | 50 | | | | 100 | | | | 0 | no |
| Comparative example 2 | | | | 50 | 50 | | | 15 | | 85 | | | 9 | no |

(Production of Printed Material)

Uniform black images (R: 0/255, G: 0/255, B: 0/255) was formed by printing with a sublimation-type thermal transfer printer (DS-40, available from Dai Nippon Printing Co., Ltd.), a genuine ink ribbon for DS-40, and a genuine image-receiving paper for DS-40 to obtain transfer-receiving articles. Each of the thermal transfer sheets of Examples described above was heated from the back layer side with a thermal head provided in the following thermal transfer printer to form a transfer layer on the transfer-receiving article, thereby producing a printed material.

Printing voltage: 18.5 V

One line period: 3 msec.

Printing start temperature: 35° C.

Pulse duty ratio: 85%

In Comparative example 1, a printed material was produced as in Example 1, except that the printing voltage was changed to 19.5 V.

<<Measurement of Surface of Printed Material>>

Spk, Sdr, Sdq, Spd, Sxp, Spc and Vmp of the surfaces of the printed materials of Examples and Comparative examples described above were measured in the range of 500 μm×500 μm in accordance with ISO 25178-2:2012. As a measuring instrument, a shape analysis laser microscope (Keyence Corporation VK-X150) was used. Table 2 presents the results.

TABLE 2

| | Example | | | | | | | |
|---|---|---|---|---|---|---|---|---|
| | 1 | 2 | 3 | 4 | 5 | 6 | 7 | 8 |
| S p k (μm) | 0.97 | 0.95 | 0.94 | 0.93 | 0.96 | 0.73 | 0.61 | 1.18 |
| S d r | 0.018 | 0.027 | 0.026 | 0.032 | 0.029 | 0.037 | 0.043 | 0.012 |
| S d q | 0.16 | 0.21 | 0.24 | 0.27 | 0.31 | 0.29 | 0.3 | 0.13 |
| S p d ($\mu m^{-2}$) | 131000 | 127000 | 128000 | 118000 | 123000 | 111000 | 106000 | 148000 |
| S x p (μm) | 1.67 | 1.58 | 1.63 | 1.58 | 1.62 | 1.38 | 1.15 | 1.71 |
| S p c | 433 | 442 | 441 | 455 | 451 | 473 | 386 | 403 |
| Vmp ($mL/m^2$) | 0.044 | 0.041 | 0.042 | 0.040 | 0.043 | 0.040 | 0.032 | 0.051 |

| | Example | | | | | | Comparative example | |
|---|---|---|---|---|---|---|---|---|
| | 9 | 10 | 11 | 12 | 13 | 14 | 1 | 2 |
| S p k (μm) | 1.07 | 0.97 | 0.83 | 0.63 | 1.12 | 0.98 | 0.39 | 0.52 |
| S d r | 0.014 | 0.019 | 0.038 | 0.042 | 0.011 | 0.025 | 0.053 | 0.031 |
| S d q | 0.14 | 0.16 | 0.27 | 0.31 | 0.15 | 0.28 | 0.33 | 0.28 |
| S p d ($\mu m^{-2}$) | 142000 | 133000 | 110000 | 109000 | 131000 | 126000 | 97500 | 102000 |
| S x p (μm) | 1.59 | 1.62 | 1.42 | 1.21 | 1.67 | 1.63 | 0.97 | 1.08 |

TABLE 2-continued

| | | | | | | | | |
|---|---|---|---|---|---|---|---|---|
| S p c | 415 | 428 | 467 | 507 | 418 | 437 | 569 | 428 |
| Vmp (mL/m$^2$) | 0.049 | 0.047 | 0.040 | 0.038 | 0.048 | 0.042 | 0.022 | 0.028 |

<<Evaluation of Feeling of Unevenness>>

With respect to the printed materials of Examples and Comparative examples described above, the surfaces of the printed materials were rubbed with a finger, and the tactile sensation was evaluated in accordance with the following evaluation criteria. Table 3 presents the evaluation results.

(Evaluation Criteria)

A: Unevenness was able to be easily detected.

B: Unevenness was able to be detected.

C: Unevenness was able to be slightly detected with a careful touch.

NG: Unevenness was not able to be detected at all.

<<Durability Evaluation>>

A tabor test (load: 500 gf, 60 cycles/min) according to ANSI-INCITS 322-2002, 5.9 Surface Abrasion was conducted on the printed materials of Examples and Comparative examples described above with a tabor tester (abrading wheel: CS-10F).

ISO visual densities were measured with a reflection densitometer (i1-pro2, available from X-Rite) every 50 cycles completed. The number of cycles was checked when the ISO visual density decreased by 30% compared to the ISO visual density before the start of the Taber test. The results were then evaluated in accordance with the following evaluation criteria. Table 3 presents the evaluation results.

(Evaluation Criteria)

A: Three hundred cycles or more.

B: Two hundred cycles or more and less than 300 cycles.

C: One hundred cycles or more and less than 200 cycles.

NG: Less than 100 cycles.

<<Evaluation of Print Suitability>>

The print suitability of each of the printed materials of Examples and Comparative examples described above was evaluated in accordance with the following evaluation criteria. Table 3 presents the evaluation results.

(Evaluation Criteria)

A: No occurrence of wrinkles was observed in the printed material.

B: Wrinkles occurred at a frequency of less than 20%.

NG: Wrinkles occurred at a frequency of 20% or more.

<<Evaluation of Fingerprint Resistance>>

Fingerprints were attached to the printed materials of Examples and Comparative examples described above. The surface states were visually observed to evaluate the fingerprint resistance of the surfaces of the printed materials. Table 3 presents the evaluation results.

(Evaluation Criteria)

A: Fingerprint marks can be identified by careful observation.

B: Fingerprint marks are noticeable depending on the viewing angle.

NG: Fingerprint marks are noticeable.

TABLE 3

| | Evaluation item | | | |
|---|---|---|---|---|
| | Feeling of Unevenness | Durability | Print Suitability | Fingerprint Resistance |
| Example 1 | A | B | B | A |
| Example 2 | A | B | A | A |

TABLE 3-continued

| | Evaluation item | | | |
|---|---|---|---|---|
| | Feeling of Unevenness | Durability | Print Suitability | Fingerprint Resistance |
| Example 3 | A | B | A | A |
| Example 4 | B | B | A | B |
| Example 5 | B | B | A | B |
| Example 6 | B | B | A | B |
| Example 7 | C | B | A | B |
| Example 8 | A | C | A | A |
| Example 9 | A | C | A | A |
| Example 10 | B | B | A | A |
| Example 11 | B | B | A | B |
| Example 12 | C | B | A | B |
| Example 13 | A | C | A | A |
| Example 14 | A | A | A | B |
| Comparative example 1 | N G | B | A | A |
| Comparative example 2 | NG | C | A | A |

It should be understood by those skilled in the art that the thermal transfer sheet and the like of the present disclosure are not limited by the description of the above examples, but the above examples and specification are merely for illustrating the principle of the present disclosure, and various modifications or improvements can be made without departing from the spirit and scope of the present disclosure, and all of these modifications or improvements fall within the scope of the present disclosure as claimed. Furthermore, the scope of protection claimed by the present disclosure includes not only the description of the claims but also the equivalents thereof.

REFERENCE SIGNS LIST

10 thermal transfer sheet
11 substrate
12 peeling layer
13 adhesive layer
14 transfer layer
15 visible light-nonabsorbing particles
16 protective layer
20 printed material
21 transfer-receiving article
31 first substrate
32 particle layer
33 coloring material layer
37 protective layer
38 back layer
30 thermal transfer sheet
40 image-receiving sheet
41 second substrate
42 thermal recess-forming layer
43 receiving layer

The invention claimed is:

1. A thermal transfer sheet, comprising:
a substrate; and
a transfer layer;
wherein the transfer layer contains visible light-nonabsorbing particles, wherein, during transfer to a transfer-receiving article, the transfer layer is peeled off from the substrate at an interface between the substrate and the transfer layer and transferred to the transfer-receiving article, and wherein, after the transfer, the transfer layer has a reduced peak height (Spk) of 0.6 μm or more.

2. The thermal transfer sheet according to claim 1, wherein the visible light-nonabsorbing particles are glass particles.

3. The thermal transfer sheet according to claim 1, wherein the visible light-nonabsorbing particles are hollow particles with shells of glass.

4. The thermal transfer sheet according to claim 1, wherein the visible light-nonabsorbing particles have an average particle size of 2 μm or more and 20 μm or less.

5. The thermal transfer sheet according to claim 1, wherein the transfer layer includes at least a peeling layer and an adhesive layer, and wherein the adhesive layer contains a lubricant.

6. The thermal transfer sheet according to claim 1, wherein the transfer layer includes at least a peeling layer and a receiving layer.

7. A printed material, comprising:

a transfer-receiving article; and the transfer layer of the thermal transfer sheet according to claim 1, which is peeled off from the substrate of the thermal transfer sheet during transfer of the transfer layer to the transfer-receiving article, wherein a surface of the transfer layer side has a reduced peak height (Spk) of 0.6 μm or more.

8. The printed material according to claim 7, further comprising a protective layer on the transfer layer.

* * * * *